US006984333B2

(12) United States Patent
Matono et al.

(10) Patent No.: US 6,984,333 B2
(45) Date of Patent: Jan. 10, 2006

(54) THIN FILM MAGNETIC HEAD, METHOD OF MANUFACTURING THE SAME AND MAGNETIC RECORDING APPARATUS

(75) Inventors: Naoto Matono, Saku (JP); Shigeru Shoji, Tokyo (JP)

(73) Assignees: TDK Corporation, Tokyo (JP); SAE Magnetics (H.K.) Ltd., Hong Kong (HK)

( * ) Notice: Subject to any disclaimer, the term of this patent is extended or adjusted under 35 U.S.C. 154(b) by 197 days.

(21) Appl. No.: 10/386,443

(22) Filed: Mar. 13, 2003

(65) Prior Publication Data

US 2003/0189787 A1    Oct. 9, 2003

(30) Foreign Application Priority Data

Apr. 5, 2002    (JP)    ............... 2002-104332

(51) Int. Cl.
  *B44C 1/22*    (2006.01)
  *G11B 5/127*   (2006.01)
  *H04R 31/00*   (2006.01)
(52) U.S. Cl. .................. 216/22; 29/603.07
(58) Field of Classification Search ........... 216/22; 29/603.01–603.27; 438/3; 360/110–130.34, 360/313–328
See application file for complete search history.

(56) References Cited

U.S. PATENT DOCUMENTS 6,286,200 B1 * 9/2001 Huang et al. ............ 29/603.12

FOREIGN PATENT DOCUMENTS

JP    A 6-274811    9/1994

* cited by examiner

*Primary Examiner*—Parviz Hassanzadeh
*Assistant Examiner*—Roberts Culbert
(74) *Attorney, Agent, or Firm*—Oliff & Berridge, PLC

(57) ABSTRACT

Provided is a thin film magnetic head capable of improving recording performance. The thin film magnetic head comprises a laminate including a main pole layer and an auxiliary pole layer being disposed in a region facing the main pole layer with a non-magnetic layer in between. After magnetic flux generated in a thin film coil is contained in the auxiliary pole layer through the non-magnetic layer, and then is concentrated on a front end neighboring portion of a front end portion in the auxiliary pole layer, the magnetic flux passes through the non-magnetic layer again so as to flow into a front end portion of the main pole layer. A "main magnetic flux incoming route" flowing from a rear end portion to the front end portion in the main pole layer and an "auxiliary magnetic flux incoming route" flowing from the auxiliary pole layer to the front end portion of the main pole layer can be obtained, so an amount of the magnetic flux supplied to a portion of the front end portion of the main pole layer on a trailing side increases. As a sufficient amount of the magnetic flux is supplied to a portion of the front end portion of the main pole layer on the trailing side so that an emitting amount of the magnetic flux increases, thereby a generation intensity and a magnetic field gradient of a perpendicular magnetic field can be obtained.

5 Claims, 27 Drawing Sheets

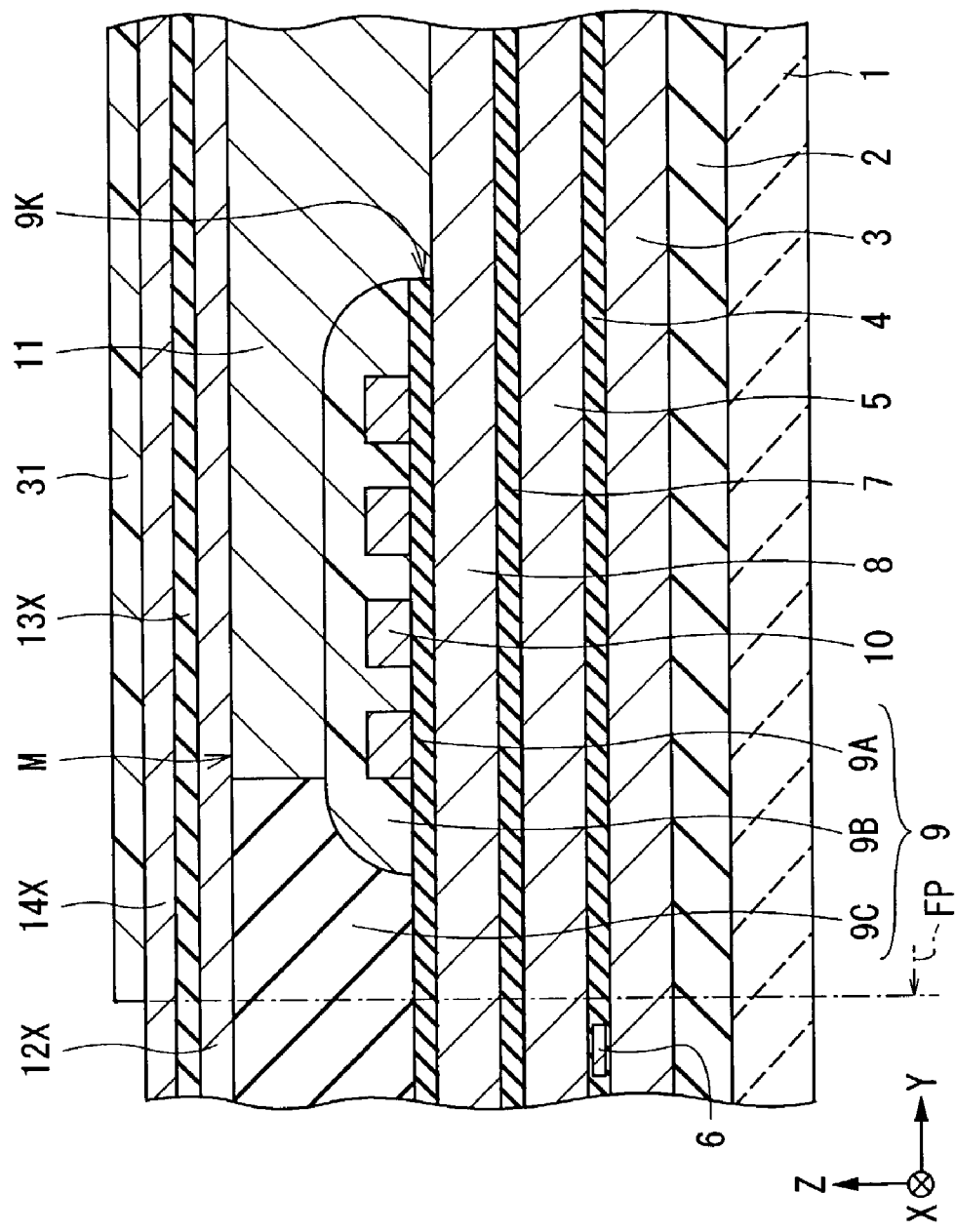
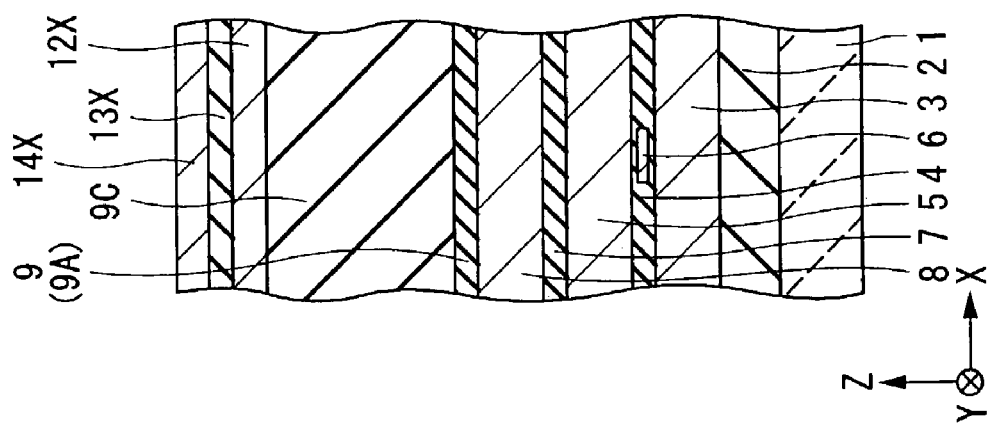
FIG. 5B
FIG. 5A

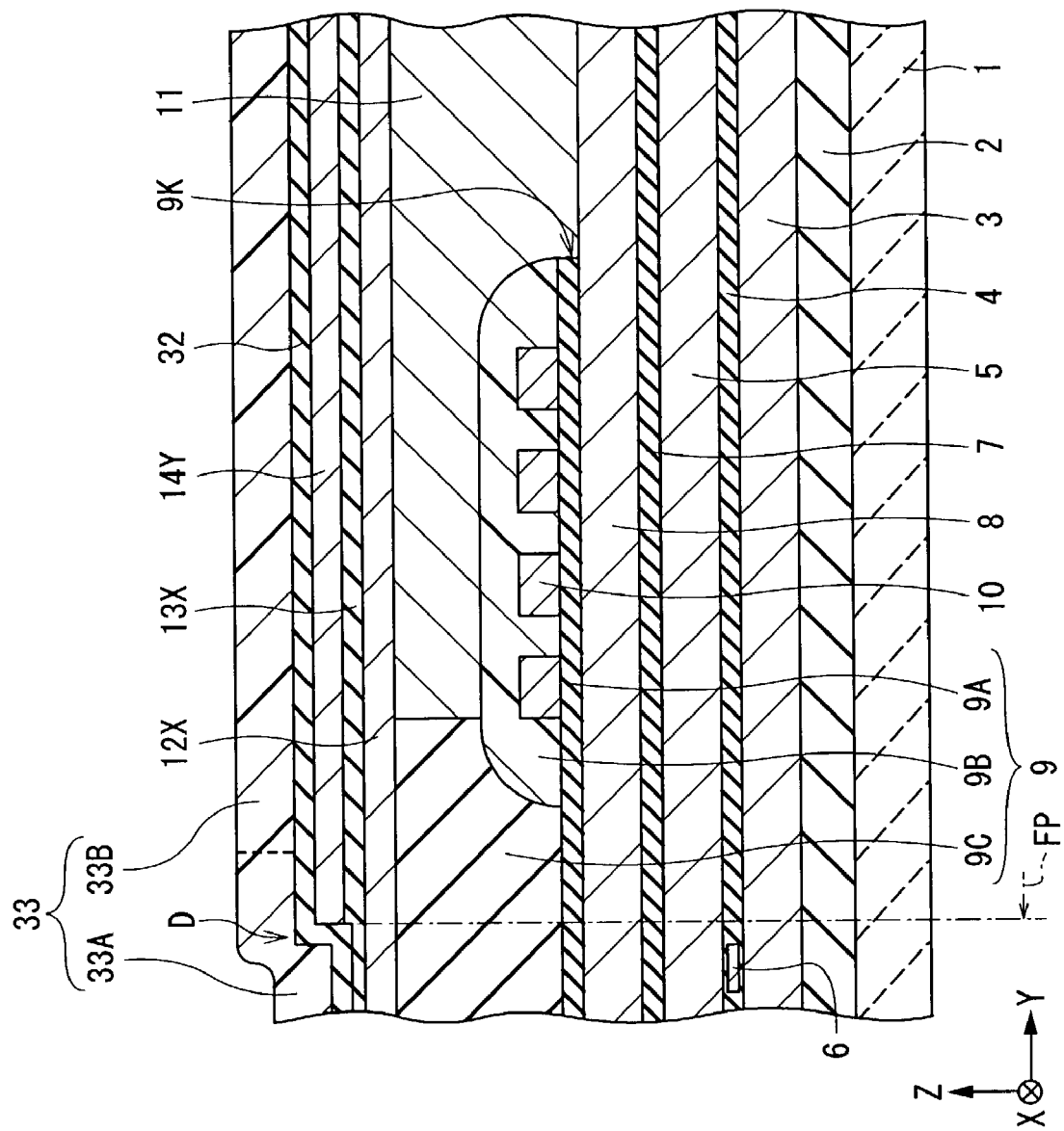
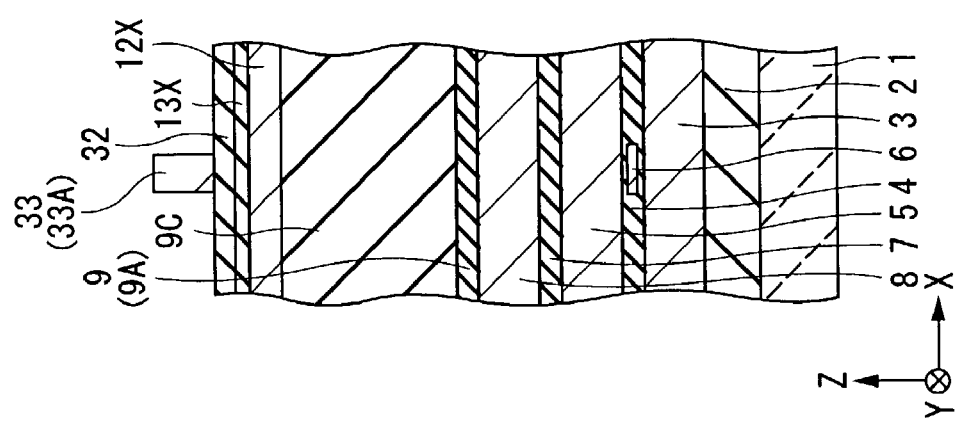
FIG. 7B
FIG. 7A

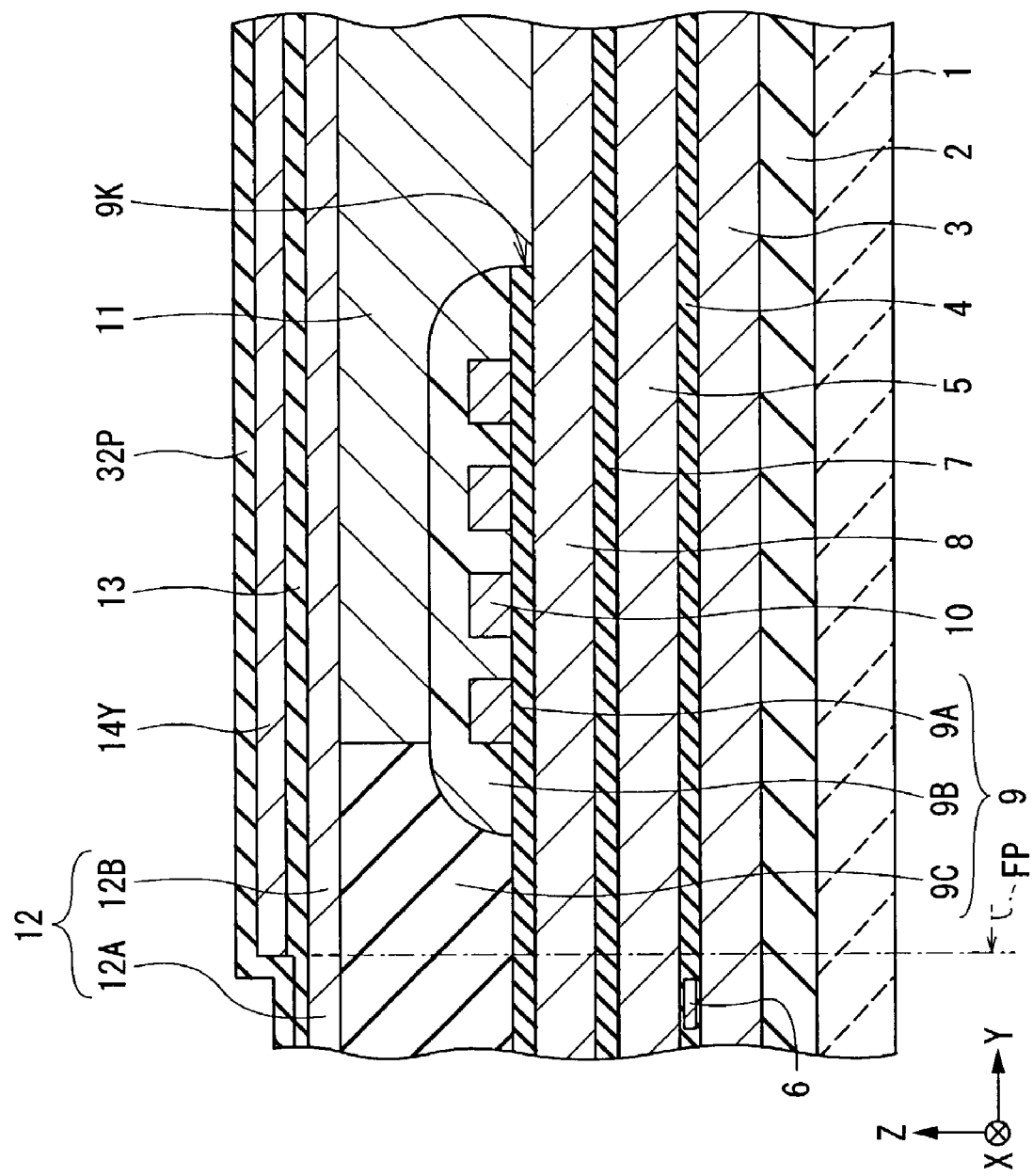
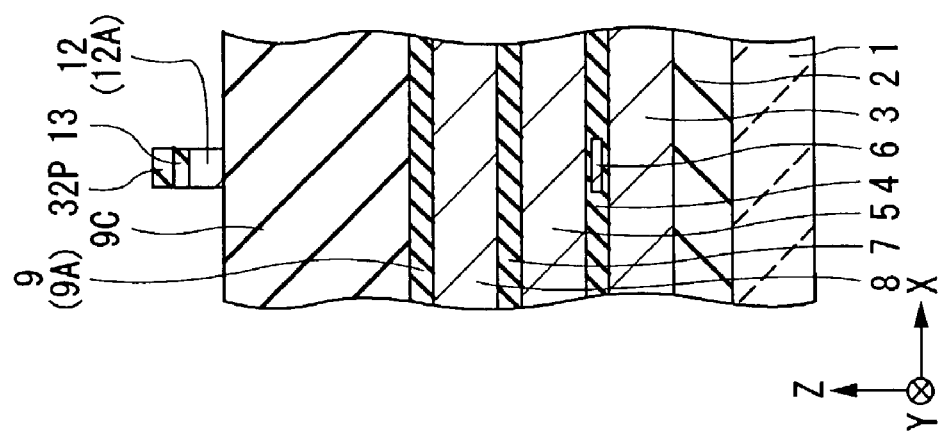
FIG. 9A
FIG. 9B

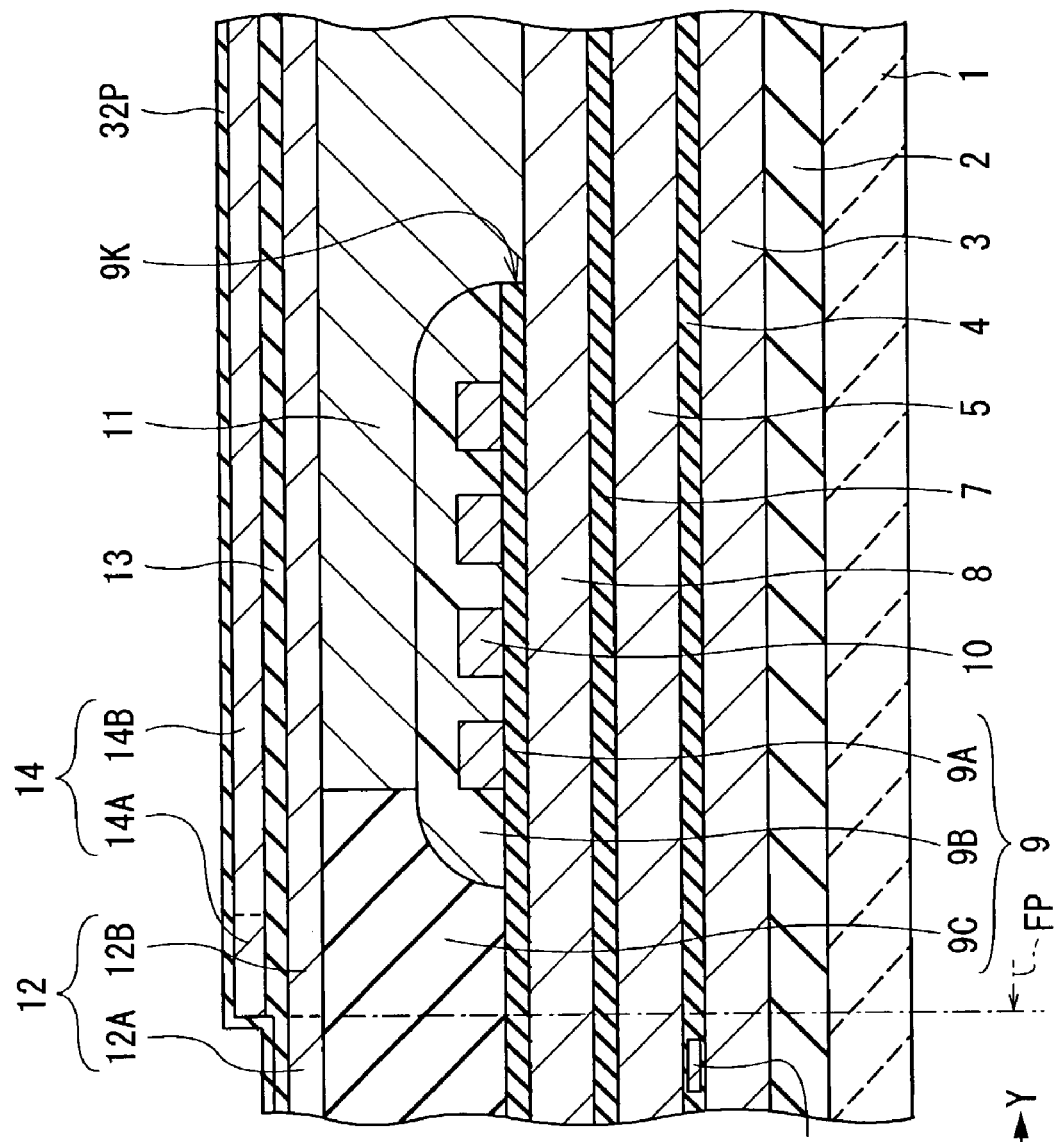
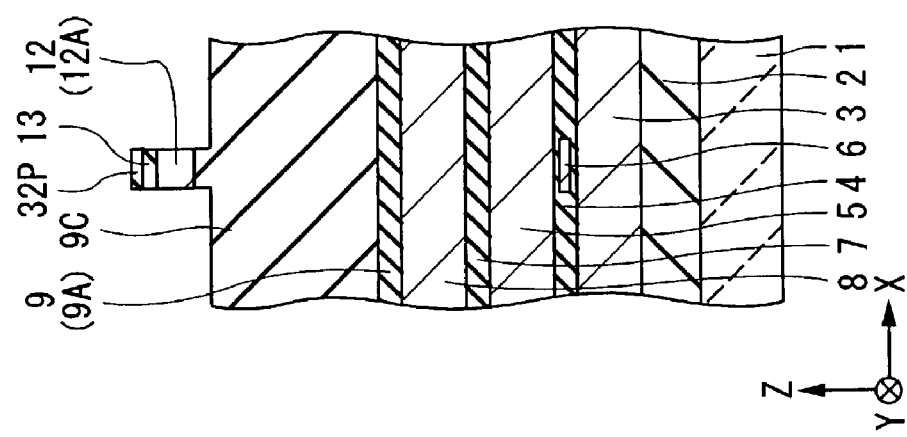
FIG. 10B
FIG. 10A

THIN FILM MAGNETIC HEAD, METHOD OF MANUFACTURING THE SAME AND MAGNETIC RECORDING APPARATUS

BACKGROUND OF THE INVENTION

1. Field of the Invention

The present invention relates to a thin film magnetic head comprising at least an inductive magnetic transducer for recording, a method of manufacturing the same, and a magnetic recording apparatus such as, for example, a hard disk drive which comprises the thin film magnetic head.

2. Description of the Related Art

In recent years, an improvement in performance of thin film magnetic heads has been sought in accordance with an increase in the areal density of a magnetic recording medium (hereinafter simply referred to as "recording medium") such as, for example, a hard disk. As magnetic recording systems applicable to thin film magnetic heads, for example, a longitudinal recording system that a signal magnetic field is oriented in an in-plane direction of a recording medium (a longitudinal direction) and a perpendicular recording system that the signal magnetic field is oriented in a direction perpendicular to the recording medium are well-known. At present, the longitudinal recording system is widely used, but in consideration of market forces in accordance with an improvement in areal density, the perpendicular recording system instead of the longitudinal recording system holds promise for future, because the perpendicular recording system can obtain an advantage that higher liner recording density can be achieved, and a recording medium in which data has been already recorded has resistance to thermal decay effects.

As recording modes using the perpendicular recording system, for example, (1) a mode of using a head (ring type head) facing each other with a gap in between on a side of an end and being magnetically coupled to each other on a side of the other end and a single-layer recording medium and (2) a mode of using a head (single pole type head) being disposed perpendicular to a recording medium and a two-layer recording medium have been proposed. In these modes, based upon a point that the mode using a combination of the single pole type head and the two-layer recording medium has superior resistance to thermal decay, the mode becomes a focus of attention as a mode which can improve the performance of thin film magnetic heads.

In order to improve the recording performance of a perpendicular recording system thin film magnetic head, for example, the following two points are mainly important, when a "main pole layer" which becomes a main flow path of magnetic flux in the single pole type head is designed.

Firstly, in order to increase a recording density, it is required to form a portion with a minute unifrom width (hereinafter referred to as "uniform width portion"), which determines a recording track width of the recording medium, in the main pole layer with high accuracy. Conventionally, the main pole layer is formed through patterning a magnetic layer in a predetermined pattern shape by use of, for example, techniques of photolithography, film formation, etching or the like. When the main pole layer is formed, in order to form the uniform width portion with high accuracy, high processing accuracy is required.

Secondly, in order to prevent magnetic saturation so as to supply a sufficient amount of magnetic flux to the uniform width portion, it is required to bring a portion with a larger width than the uniform width portion (hereinafter referred to as "widening width portion") in a main pole layer as close to a recording-medium-facing surface (air bearing surface) as no emission of excessive magnetic flux is induced. The position of a front edge (an edge on a side close to the air bearing surface) of the widening width portion determines a position where the width of the main pole layer expands from the uniform width portion to the widening width portion, and the position is generally called a "flare point". The flare point is a position where the magnetic flux flowing through the main pole layer from the widening width portion to the uniform width portion is focused, so from the viewpoint of supplying the magnetic flux to the uniform width portion, the flare point is one of factors which determine the recording performance of the thin film magnetic head.

However, conventional methods of manufacturing a thin film magnetic head has such a problem that in spite of the fact that highly accurate formation of the uniform width portion and proper positioning of a flare point are required in order to improve the recording performance, it is difficult for them to be compatible. The reason why it is difficult is as follows.

In the case where a photoresist is selectively exposed by use of, for example, photolithography so as to form a photoresist pattern which is required to form the main pole, when a region with a minute width corresponding to the uniform width portion and a region with a wide width corresponding to the widening width portion are included in the photoresist pattern to be exposed, a surrounding portion of the region with the minute width is unnecessarily exposed by an influence of reflected light generated during exposure, so that an exposed region may be expanded. When the exposed region is expanded, the forming accuracy of the photoresist pattern declines, so it is difficult to form the uniform width portion with high accuracy. Further, as the flare point comes closer to the air bearing surface, thereby a ratio of the region with the wide width to the region with the minute width increases, a problem with the forming accuracy of the uniform width portion becomes more pronounced. Therefore, conventionally, the highly accurate formation of the uniform width portion and proper positioning of the flare point have a trade-off relationship therebetween. In order to prove the practicality and promise of the perpendicular recording system, and spread high-capacity hard disk drives using the system, there is an urgent need to overcome the above problem and achieve the improvement in the recording performance.

In addition, for example, a related art of which an object is to improve the recording performance of a thin film magnetic head using the perpendicular recording system like the present invention has been disclosed by Takahashi et al. in Japanese Unexamined Patent Application Publication No. Hei 6-274811. Takahashi et al. have disclosed a technique to achieve high-density recording through using an appropriate material of a perpendicular magnetic head. However, no specific way to achieve the compatibility between the highly accurate formation of the main pole layer and proper positioning of the flare point has been indicated in the related art.

SUMMARY OF THE INVENTION

In view of the foregoing, it is a first object of the present invention to provide a thin film magnetic head capable of improving recording performance.

Moreover, it is a second object of the invention to provide a method of manufacturing a thin film magnetic head capable of achieving compatibility between the highly accurate formation of a main pole layer and proper positioning of a flare point so as to contribute an improvement in the recording performance in the viewpoint of manufacturing.

Further, it is a third object of the invention to provide a magnetic recording apparatus capable of improving recording performance.

A thin film magnetic head according to the invention comprises a thin film coil generating magnetic flux and a pole layer emitting the magnetic flux generated in the thin film coil to a recording medium, wherein the pole layer comprises a laminate including a main pole layer having an end surface exposed to a recording-medium-facing surface facing the recording medium, an auxiliary pole layer being disposed so as to face a part of the main pole layer, and a non-magnetic layer being disposed in a region where the main pole layer and the auxiliary pole layer face each other so as to be sandwiched between these two layers.

In the thin film magnetic head according to the invention, the magnetic flux generated in the thin film coil is contained in the main pole layer, and the magnetic flux is also contained in the auxiliary pole layer through the non-magnetic layer. The magnetic flux contained in the auxiliary pole layer passes through the non-magnetic layer again in the neighborhood of an end so as to flow into the main pole layer. Thereby, the magnetic flux having flown through both of the main pole layer and the auxiliary pole layer is concentrated on a portion of the main pole layer on a medium-outgoing side (trailing side).

In a method of manufacturing a thin film magnetic head according to the invention, the thin film magnetic head comprises a thin film coil generating magnetic flux, and a pole layer comprising a laminate including a main pole layer having a plane shape including a uniform width region with a uniform width determining a recording track width of a recording medium and a widening width region with a larger width than the uniform width region, and having an end surface exposed to a recording-medium-facing surface facing the recording medium, an auxiliary pole layer being disposed so as to face a part of the main pole layer, and a non-magnetic layer being disposed in a region where the main pole layer and the auxiliary pole layer face each other so as to be sandwiched between these two layers, and the pole layer emits the magnetic flux generated in the thin film coil to the recording medium, wherein a first mask layer to become a mask determining the widening width region and a second mask layer to become a mask determining the uniform width region are independently formed through separate steps, and the formation of the pole layer is completed through a series of patterning steps by use of the first mask layer and the second mask layer.

In the method of manufacturing a thin film magnetic head according to the invention, the pole layer is formed through a series of patterning steps by use of the first and the second mask layers which are independently formed in separate steps. In the patterning steps, the widening width region of the pole layer is determined by the first mask layer as a mask, and the uniform width region is determined by the second mask layer as a mask. Therefore, the widening width region or the uniform width region is independently determined by two kinds of mask layers which are different from each other.

A magnetic recording apparatus according to the invention comprises a recording medium and a thin film magnetic head magnetically recording information on the recording medium, and the thin film magnetic head comprises a thin film coil generating magnetic flux and a pole layer emitting the magnetic flux generated in the thin film coil to the recording medium, and the pole layer comprises a laminate including a main pole layer having an end surface exposed to a recording-medium-facing surface facing the recording medium, an auxiliary pole layer being disposed so as to face a part of the main pole layer, and a non-magnetic layer being disposed in a region where the main pole layer and the auxiliary pole layer face each other so as to be sandwiched between these two layers.

In the magnetic recording apparatus according to the invention, information is magnetically recorded on the recording medium by the thin film magnetic head according to the invention.

In the thin film magnetic head according to the invention, the pole layer may have a plane shape including a uniform width region with a uniform width determining a recording track width of the recording medium and a widening width region having a larger width than the uniform width region as a whole. The "plane shape" means a silhouette shape of a plan view of a laminate including the main pole layer, the non-magnetic layer and the auxiliary pole layer.

Further, in the thin film magnetic head according to the invention, a step in a thickness direction of the pole layer may be formed in a widening width position where a width of the pole layer expands from the uniform width region to the widening width region. The "step" means a step shown in a silhouette of a sectional view of a laminate including the main pole layer, the non-magnetic layer and the auxiliary pole layer.

Further, in the thin film magnetic head according to the invention, when the recording medium moves toward a predetermined direction of medium movement, a second auxiliary pole layer portion in the auxiliary pole layer may be disposed on a medium-outgoing side in the direction of medium movement, and the main pole layer may be disposed on a medium-incoming side in the direction of medium movement. Alternatively, a fifth main pole layer portion in the main pole layer may be disposed on the medium-outgoing side in the direction of medium movement, and the auxiliary pole layer may be disposed on the medium-incoming side in the direction of medium movement. The "medium-outgoing side" means a side where when the movement of the recording medium toward the direction of medium movement is considered as a flow, the flow outgoes, on the other hand, the "medium-incoming side" means a side where the flow incomes.

Moreover, in the thin film magnetic head or the magnetic recording apparatus according to the invention, the pole layer may be configured so as to emit magnetic flux for magnetizing the recording medium in a direction perpendicular to a surface of the recording medium. In other words, the thin film magnetic head according to the invention is applicable to a single pole type head of a perpendicular recording system, and a magnetic recording apparatus comprising the thin film magnetic head can be configured.

Other and further objects, features and advantages of the invention will appear more fully from the following description.

BRIEF DESCRIPTION OF THE DRAWINGS

FIGS. 5A and 5B are sectional views for describing one step in a method of manufacturing the thin film magnetic head according to the first embodiment of the invention;

FIGS. 7A and 7B are sectional views for describing a step following the step of FIGS. 6A and 6B;

FIGS. 9A and 9B are sectional views for describing a step following the step of FIGS. 8A and 8B;

FIGS. 10A and 10B are sectional views for describing a step following the step of FIGS. 9A and 9B;

DETAILED DESCRIPTION OF THE PREFERRED EMBODIMENTS

Preferred embodiments of the present invention will be described in more detail below referring to the accompanying drawings. [First Embodiment]

Figures 1A, 1B:
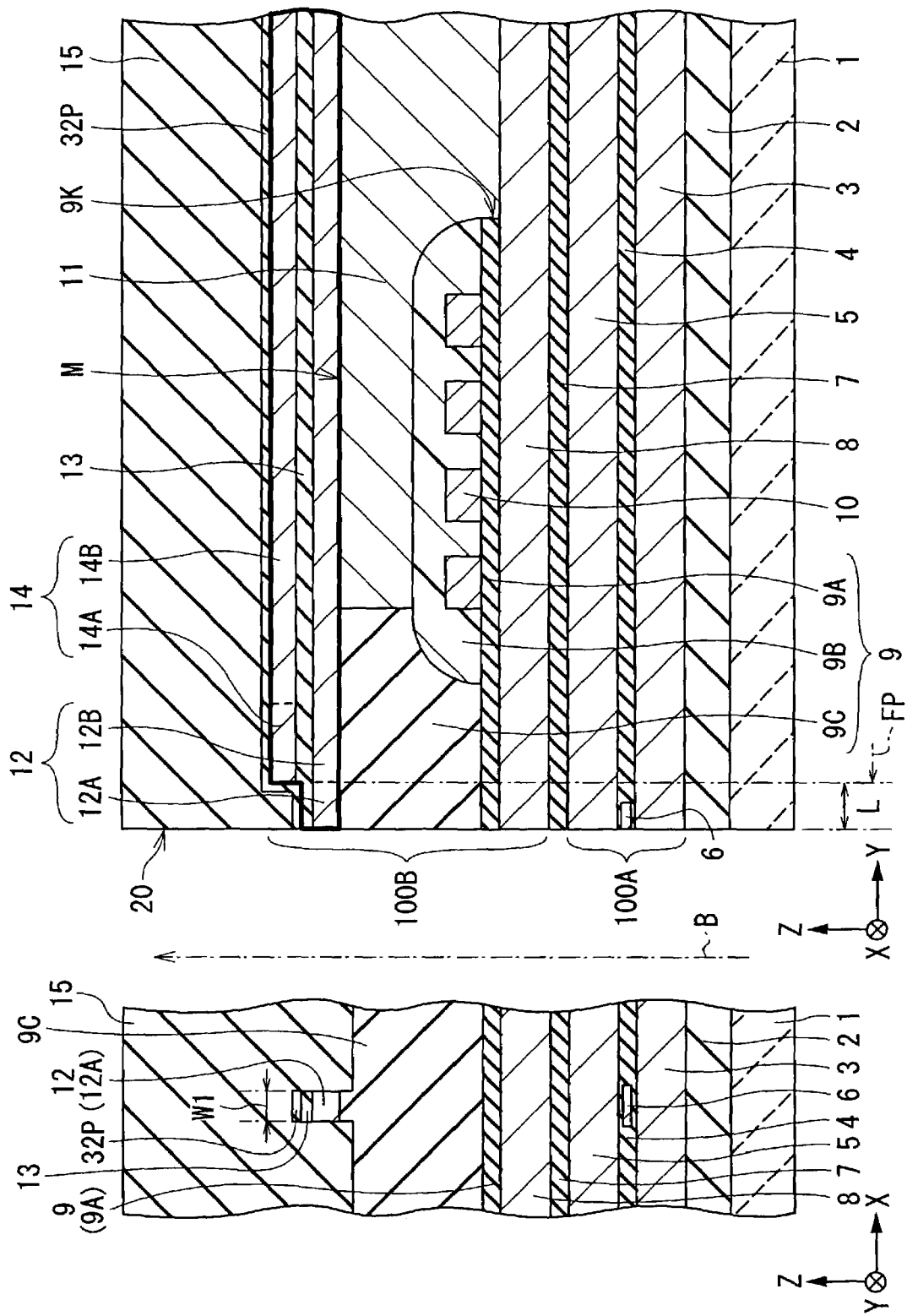
FIGS. 1A and 1B are sectional views of a thin film magnetic head according to a first embodiment of the invention.
Figure 2:
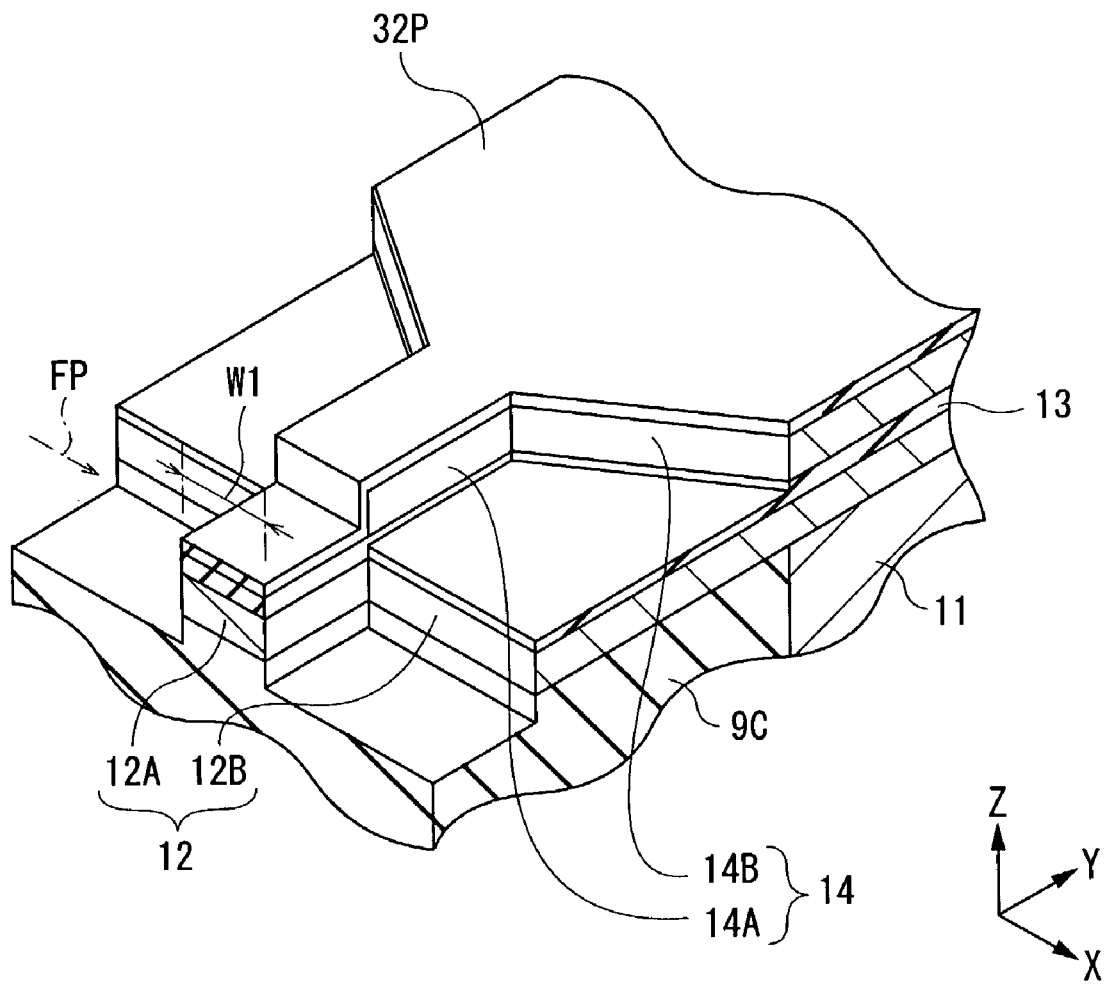
FIG. 2 is an enlarged perspective view of a main part of the thin film magnetic head shown in FIGS. 1A and 1B.
Figure 3:
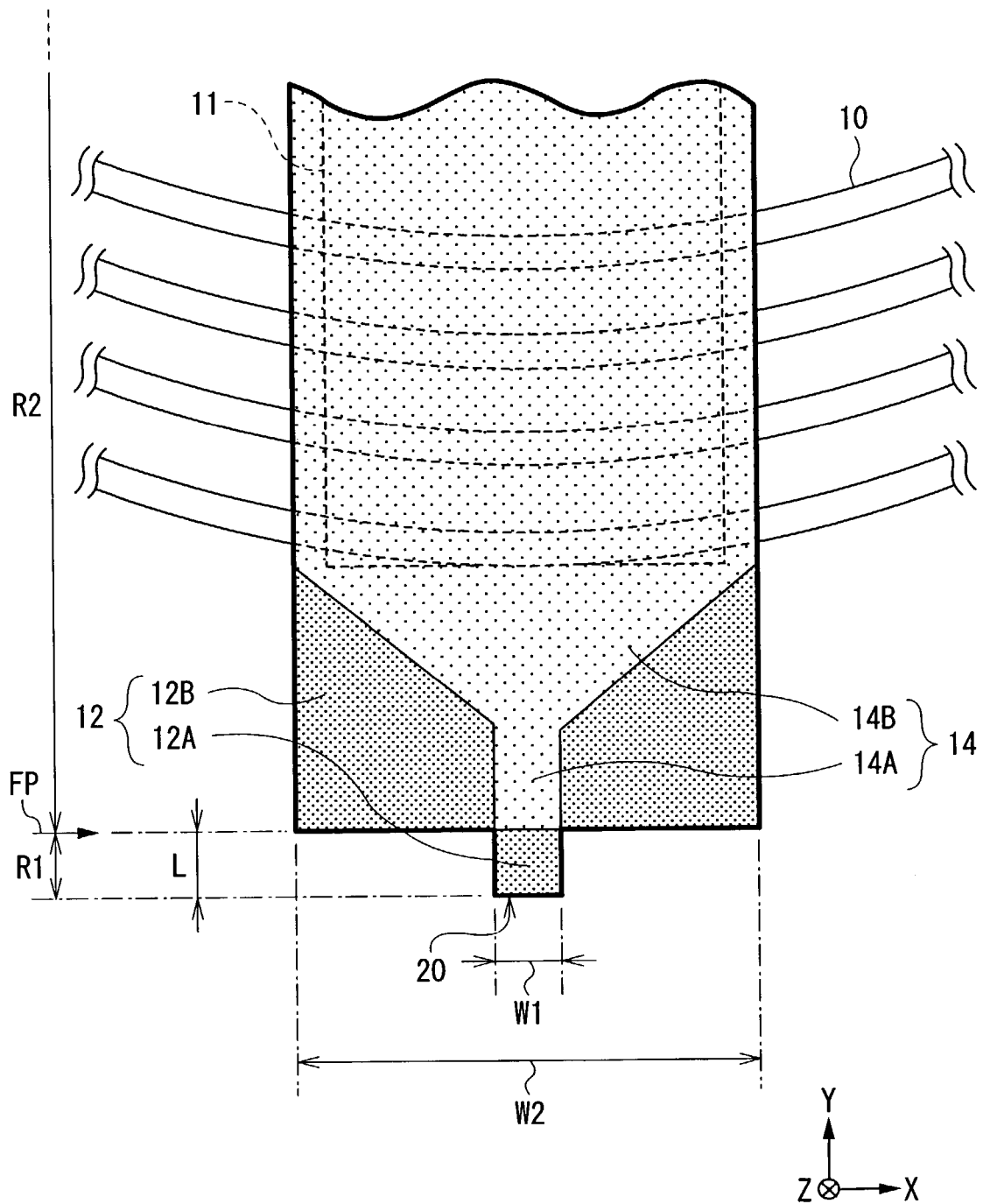
FIG. 3 is an enlarged plan view of the main part of the thin film magnetic head shown in FIGS. 1A and 1B.

At first, referring to FIGS. 1A through 3, a structure of a thin film magnetic head according to a first embodiment of the invention will be described below. FIGS. 1A and 1B show sectional views of the thin film magnetic head, and FIG. 1A shows a sectional view parallel to an air bearing surface, and FIG. 1B shows a sectional view perpendicular to the air bearing surface. FIGS. 2 and 3 show an enlarged perspective view and an enlarged plan view of a main part of the thin film magnetic head shown in FIGS. 1A and 1B, respectively. An up arrow B in FIGS. 1A and 1B indicates a direction in which a recording medium (not shown) moves relative to the thin film magnetic head, that is, a direction of movement of the recording medium (direction of medium movement).

In the following description, a distance in an X-axis direction, a distance in a Y-axis direction and a distance in a Z-axis direction in FIGS. 1A through 3 are expressed as "a width", "a length" and "a thickness", respectively. Further a side closer to an air bearing surface 20 in the Y-axis direction is expressed as "front or frontward", and the opposite side is expressed as "rear or rearward". In FIGS. 4 through 33, these directions are expressed as the same.

The thin film magnetic head is, for example, a composite head capable of implementing two functions of recording and reproducing, and as shown in FIGS. 1A and 1B, the thin film magnetic head comprises an insulating layer 2 made of, for example, aluminum oxide ($Al_2O_3$; hereinafter simply referred to as "alumina"), a reproducing head 100A using a magnetoresistive (MR) effect to perform reproducing, a non-magnetic layer 7 made of, for example, alumina, a single pole type recording head 100B performing recording by a perpendicular recording system and an overcoat layer 15 made of, for example, alumina or the like laminated in this order on a substrate 1 made of, for example, a ceramic material such as AlTiC ($Al_2O_3$—TiC).

The reproducing head 100A comprises, for example, a bottom shield layer 3, a shield gap film 4 and a top shield layer 5 laminated in this order. An MR device 6 as a reproducing device is buried in the shield gap film 4 so that a surface of the MR device 6 is exposed to a recording-medium-facing surface (air bearing surface) 20 facing a recording medium.

The bottom shield layer 3 and the top shield layer 5 are made of, for example, a magnetic material such as a nickel iron alloy (NiFe; hereinafter simply referred to as "Permalloy (trade name)"; Ni: 80% by weight, Fe: 20% by weight) with a thickness of approximately 1.0 $\mu$m to 2.0 $\mu$m. The shield gap film 4 is provided to electrically separate the MR device 6 from its surroundings, and is made of, for example, a non-conductive and non-magnetic material such as alumina. The MR device 6 uses, for example, a giant magnetoresistive (GMR) effect, a tunneling magnetoresistive (TMR) effect or the like.

The recording head 100B comprises, for example, a return yoke 8, a thin film coil 10 for generating magnetic flux buried in a gap layer 9 with an aperture 9K, a yoke 11 magnetically coupled to the return yoke 8 in the aperture 9K, a main pole layer 12 magnetically coupled to the return yoke 8 through the yoke 11, an auxiliary pole layer 14 sandwiching a non-magnetic layer 13 with the main pole layer 12 in a region where the auxiliary pole layer 14 and the main pole layer 12 face each other, and a non-magnetic layer pattern 32P laminated in this order. Further, in FIG. 3, the non-magnetic layer 13 and the non-magnetic layer pattern 32P are not shown, and in order to draw a clear distinction between the main pole layer 12 and the auxiliary pole layer 14, the main pole layer 12 is indicated by dark hatching, and the auxiliary pole layer 14 is indicated by light hatching. Herein, a laminate including the main pole layer 12, the non-magnetic layer 13 and the auxiliary pole layer 14 in this order corresponds to a specific example of "a pole layer" in the invention.

The return yoke 8 is provided mainly to return magnetic flux emitted to outside from the main pole layer 12 to the recording head 100B. The return yoke 8 is made of, for example, a magnetic material such as Permalloy (Ni: 80% by weight, Fe: 20% by weight) with a thickness of approximately 1.0 μm to 5.0 μm.

The gap layer 9 comprises a gap layer portion 9A disposed on the return yoke 8 and having the aperture 9K, a gap layer portion 9B disposed on the gap layer portion 9A so as to coat gaps between windings of the thin film coil 10 and their surroundings, and a gap layer portion 9C partially coating the gap layer portions 9A and 9B. The gap layer portion 9A is made of, for example, a non-conductive and non-magnetic material such as alumina with a thickness of approximately 0.1 μm to 1.0 μm. The gap layer portion 9B is made of, for example, a photoresist (photosensitive resin) exhibiting liquidity by heating, a spin-on glass (SOG) or the like. The gap layer portion 9C is made of, for example, a non-conductive and non-magnetic material such as alumina or silicon oxide ($SiO_2$) with a larger thickness than that of the gap layer portion 9B.

The yoke 11 is provided mainly to magnetically couple the return yoke 8 to the main pole layer 12, and is made of, for example, a magnetic material such as Permalloy (Ni: 80% by weight, Fe: 20% by weight). For example, a position of a surface of the yoke 11 in a height direction coincides with a position of a surface of the gap layer portion 9C in the same direction, that is, the surfaces of the yoke 11 and the gap layer portion 9C constitute a flat surface M.

The thin film coil 10 is made of, for example, a high-conductive material such as copper (Cu), and has a winding structure in a spiral shape while regarding a coupling portion between the return yoke 8 and the yoke 11 as a center. In FIGS. 1A, 1B and 3, only a part of a plurality of windings constituting the thin film coil 10 is shown.

A structure (hereinafter simply referred to as "laminate") including the main pole layer 12, the non-magnetic layer 13 and the auxiliary pole layer 14 laminated in this order is provided mainly to contain the magnetic flux generated in the thin film coil 10 and emit the magnetic flux to the recording medium (not shown). As shown in FIG. 3, the laminate has, for example, a plane shape including a uniform width region R1 with a uniform width W1 determining a recording track width of the recording medium and a widening width region R2 with a larger width W2 than that of the uniform width region R1 as a whole. The "plane shape-"means a silhouette shape of a plan view of the laminate including the main pole layer 12, the non-magnetic layer 13 and the auxiliary pole layer 14, more specifically, a shape of a region indicated by a heavy line. A position where the width of the laminate expands from the uniform width region R1 to the widening width region R2 corresponds to "a flare point (widening width position) FP" which is one of factors determining recording performance of the thin film magnetic head. The main pole layer 12 and the auxiliary pole layer 14 have, for example, different plane shapes from each other.

In the laminate, as shown in FIGS. 1A and 1B, a step is formed in a thickness direction between the main pole layer 12 and the auxiliary pole layer 14 at the flare point FP. The "step" means a step shown in a silhouette of a sectional view of the laminate including the main pole layer 12, the non-magnetic layer 13 and the auxiliary pole layer 14, more specifically a step shown in a region indicated by a heavy line in FIG. 1B.

The main pole layer 12 is a part which becomes a main flow path of magnetic flux. The main pole layer 12 is made of, for example, a material with a saturated magnetic flux density equal to or higher than that of the auxiliary pole layer 14 such as Permalloy (Ni: 80% by weight, Fe: 20% by weight or Ni: 45% by weight, Fe: 55% by weight), iron nitride (FeN) and an iron-cobalt based alloy with a thickness of approximately from 0.1 μm to 0.5 μm. As the iron-cobalt based alloy, for example, an iron-cobalt alloy (FeCo), iron-cobalt alloy nitride (FeCoN), iron-cobalt alloy oxide (FeCoO), a nickel-iron-cobalt alloy (CoFeNi) and so on are cited. The main pole layer 12 extends rearward from the air bearing surface 20, and comprises, for example, a front end portion 12A and a rear end portion 12B connected with the rear of the front end portion 12A in order from air bearing surface 20. The front end portion 12A has an end surface exposed to the air bearing surface 20, and functions as a main magnetic flux emitting portion to emit the magnetic flux to outside so as to generate a perpendicular magnetic field for recording. The front end portion 12A has the uniform width W1 determining the recording track width of the recording medium. The uniform width region R1 is determined by a plane shape of the front end portion 12A. The rear end portion 12B functions as a main magnetic flux containing portion for containing the magnetic flux generated in the thin film coil 10, and has a larger width than that of the front end portion 12A (W2>W1). The flare point FP is determined by a front edge of the rear end portion 12B. A region of the gap layer portion 9C disposed frontward of the flare point FP except for a portion corresponding to the front end portion 12A is partially dug down. Herein, the front end portion 12A corresponds to a specific example of "a first main pole layer portion" in the invention, and the rear end portion 12B corresponds to a specific example of "a second main pole layer portion" in the invention.

The non-magnetic layer 13 mainly functions as a stopper layer for inhibiting the progress of etching when the main pole layer 12 is formed. A function of the non-magnetic layer 13 as the stopper layer will be described in more detail later. The non-magnetic layer 13 is made of, for example, alumina or the like with a thickness of approximately 0.015 μm to 0.65 μm. The non-magnetic layer 13 has substantially the same plane shape as the main pole layer 12.

The auxiliary pole layer 14 is a part which becomes an auxiliary flow path of magnetic flux mainly for supplying the magnetic flux to the front end portion 12A of the main pole layer 12. The auxiliary pole layer 14 is made of, for example, Permalloy (Ni: 80% by weight, Fe: 20% by weight or Ni: 45% by weight, Fe: 55% by weight), a nickel-iron-cobalt alloy or the like with a thickness of approximately 0.1 μm to 0.6 μm. The auxiliary pole layer 14 is disposed in the widening width region R2 at a position recessed by a predetermined distance (recessed distance L=approximately 0.2 μm to 1.0 μm) from the air bearing surface 20, and is completely separated from the main pole layer 12 by the non-magnetic layer 13. The auxiliary pole layer 14 extends rearward from the flare point FP, and comprises a front end portion 14A with the same uniform width W1 as that of the front end portion 12A and a rear end portion 14B connected with the rear of the front end portion 14A and having a larger width than that of the front end portion 14A in order from the flare point FP. The rear end portion 14B has a width which gradually increases in a front portion and a uniform width (for example, W2) in a rear portion. Herein, the front end portion 14A corresponds to a specific example of "a first auxiliary pole layer portion" in the invention, and the rear end portion 14B corresponds to a specific example of "a second auxiliary pole layer portion" in the invention.

As shown in FIGS. 1A and 1B, the laminate including the main pole layer 12, the non-magnetic layer 13 and the auxiliary pole layer 14 extends toward a direction perpendicular to the air bearing surface 20 (a Y-axis direction in the drawings). In other words, in the viewpoint of a positional relationship between the main pole layer 12 and the auxiliary pole layer 14 with reference to a position where the non-magnetic layer 13 is disposed, the rear end portion 14B of the auxiliary pole layer 14 is disposed on a medium-outgoing side in a thickness direction, on the other hand, the main pole layer 12 is disposed on a medium-incoming side in the thickness direction. When the movement of the recording medium toward a direction B of medium movement is considered as a flow, "a medium-outgoing side", means a side where the flow outgoes, and is generally called "a trailing side". On the contrary, "a medium-incoming side" means a side where the flow incomes, and is generally called "a leading side". Herein, for example, a side far from the gap layer 9 (a top side in the drawing) and a side near the gap layer 9 (a bottom side in the drawing) in a Z-axis direction in the drawing is "the medium-outgoing side" and "the medium-incoming side", respectively.

The non-magnetic layer pattern 32P mainly functions as a stopper layer for inhibiting the progress of etching when the auxiliary pole layer 14 is formed. A function of the non-magnetic layer pattern 32P as the stopper layer will be described in more detail later. The non-magnetic layer pattern 32P is made of, for example, alumina or the like, and has substantially the same plane shape as the auxiliary pole layer 14.

Next, referring to FIGS. 1A through 3, actions of the thin film magnetic head will be described below.

In the thin film magnetic head, in recording information, when a current flows into the thin film coil 10 of the recording head 100B through an external circuit (not shown), magnetic flux is generated in the thin film coil 10. The magnetic flux generated at this time is contained mainly in the main pole layer 12 through the yoke 11 and is also contained in the auxiliary pole layer 14 through the non-magnetic layer 13. The magnetic flux contained in the main pole layer 12 flows from the rear end portion 12B to the front end portion 12A, on the other hand, the magnetic flux contained in the auxiliary pole layer 14 flows from the rear end portion 14B to the front end portion 14A likewise. At this time, the magnetic flux flowing from the rear end portion 12B to the front end portion 12A in the main pole layer 12 is narrowed and focused at the flare point FP in accordance with a decreasing width of the main pole layer 12 (W2 to W1). Further, after the magnetic flux flowing from the rear end portion 14B to the front end portion 14A in the auxiliary pole layer 14 is concentrated on a front end neighboring portion of the front end portion 14A, the magnetic flux passes through the non-magnetic layer 13 again, and flows into the front end portion 12A of the main pole layer 12. Thereby, the magnetic flux is mainly concentrated on a portion of the front end portion 12A on the trailing side. The magnetic flux is emitted from the front end portion 12A to outside so as to generate a magnetic field (perpendicular magnetic field) in a direction perpendicular to a surface of the recording medium (perpendicular direction). Then, the perpendicular magnetic field magnetizes the recording medium in a perpendicular direction so that information is recorded in the recording medium.

On the contrary, in reproducing, when a sense current flows into the MR device 6 of the reproducing head 100A, the resistance of the MR device 6 is changed depending upon a signal magnetic field for reproducing from the recording medium. A change in the resistance is detected as a change in the sense current so that the information recorded in the recording medium is read out.

As described above, the thin film magnetic head according to the embodiment comprises a laminate including the main pole layer 12 and the auxiliary pole layer 14 disposed in a region facing the main pole layer 12 with the non-magnetic layer 13 in between, so as described above, after the magnetic flux generated in the thin film coil 10 is contained in the auxiliary pole layer 14 through the non-magnetic layer 13, the magnetic flux passes through the non-magnetic layer 13 again so as to flow into the front end portion 12A of the main pole layer 12. In other words, in spite of the fact that the auxiliary pole layer 14 is completely separated from the main pole layer 12 by the non-magnetic layer 13, the auxiliary pole layer 14 has a function of accessorily supplying the magnetic flux to the front end portion 12A which is a main magnetic flux emitting portion. Thereby, "a main magnetic flux incoming route" from the rear end portion 12B to the front end portion 12A in the main pole layer 12 as well as "an auxiliary magnetic flux incoming route" from the auxiliary pole layer 14 to the front end portion 12A of the main pole layer 12 can be obtained, so compared with the case of including only the main pole layer 12 and not including the auxiliary pole layer 14, an amount of the magnetic flux supplied to the portion of the front end portion 12A on the trailing side which is the main magnetic flux emitting portion is more increased. Therefore, a larger amount of the magnetic flux is supplied to the portion of the front end portion 12A on the trailing side so that an emitting amount of the magnetic flux is increased, and thereby a generation intensity and a magnetic field gradient of the perpendicular magnetic field can be obtained, so recording performance can be improved.

Moreover, in the embodiment, the rear end portion 12B with a larger width in the main pole layer 12 is disposed at a position recessed by a small amount of the recessed distance L (=approximately 0.2 $\mu$m to 1.0 $\mu$m) from the air bearing surface 20, so the flare point FP determined by the front edge of the rear end portion 12B is closer to the air bearing surface 20. In this case, in the main pole layer 12, after the magnetic flux contained in the rear end portion 12B is led close to the air bearing surface 20, the magnetic flux is focused just before it is emitted from the front end portion 12A to outside, so compared with the case where the flare point FP is farther from the air bearing surface 20, an effect relating to a focus of the magnetic flux becomes more pronounced. Therefore, as the flare point FP is properly adjusted, more magnetic flux is focused on the front end portion 12A. In this point of view, the embodiment can contribute to obtaining the generation intensity of the perpendicular magnetic field.

Further, in the embodiment, the saturated magnetic flux density of the main pole layer 12 is equal to or higher than that of the auxiliary pole layer 14, so an amount of the magnetic flux is increased more in the main pole layer 12 including the frond end portion 12A which is the main magnetic flux emitting portion than in the auxiliary pole layer 14. Therefore, in the viewpoint of an increase in the amount of the magnetic flux, the embodiment can contribute to obtaining the generation intensity of the perpendicular magnetic field.

Figure 4:
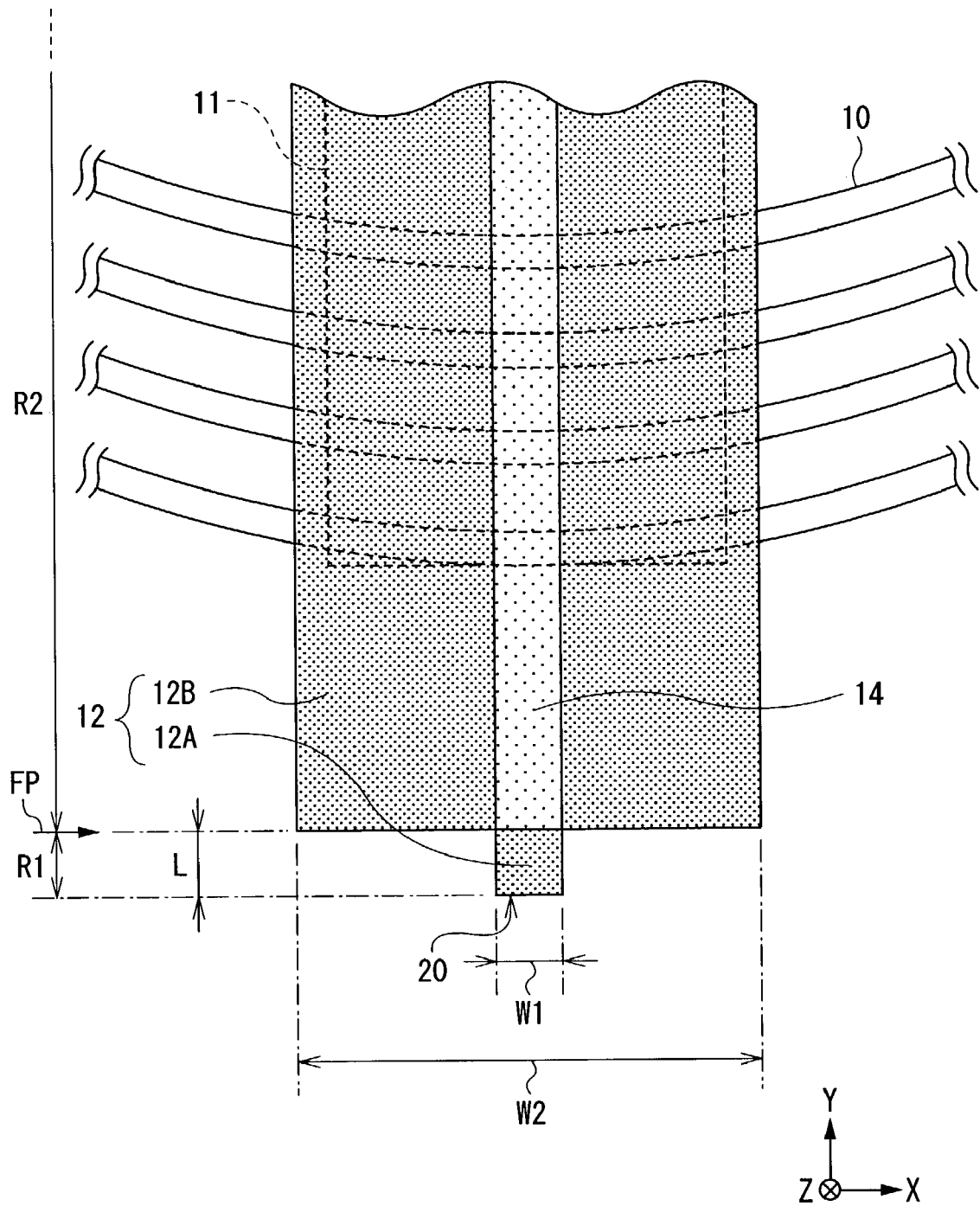
FIG. 4 is a plan view of a modification to the main part of the thin film magnetic head shown in FIG. 3.

Although the rear end portion 14B of the auxiliary pole layer 14 has a larger width than the width W1 of the front end portion 14A in the embodiment, it is not necessarily limited to this. For example, the rear end portion 14B may have the same width W1 as the front end portion 14A, and as shown in FIG. 4, the whole auxiliary pole layer 14 may have the uniform width W1. Also in this case, "the auxiliary magnetic flux incoming route" is secured in the auxiliary pole layer 14, so the same effects as the above embodiment can be obtained. Incidentally, a main part of the thin film magnetic head shown in FIG. 4 is equivalent to that shown in FIG. 3, except for the above characteristic part.

Moreover, in the embodiment, the top shield layer 5 and the return yoke 8 are separated from each other by the non-magnetic layer 7 to form separated bodies, but it is not necessarily limited to this. For example, the top shield layer 5 and the return yoke 8 may be integrated without disposing the non-magnetic layer 7. In this case, a thickness of an integrated layer including the top shield layer 5 and the return yoke 8 (top shield layer-cum-return yoke) can be freely set.

Next, referring to FIGS. 1A through 3, 5A through 15, a method of manufacturing the thin film magnetic head according to the embodiment will be described below. FIGS. 5A through 10B show sectional views of each step in the method of manufacturing the thin film magnetic head, and FIGS. 11 through 15 show perspective views corresponding to FIGS. 5A and 5B through 9A and 9B, respectively.

At first, the method of manufacturing the thin film magnetic head will be briefly described below, and then a method of forming a main part to which the method of manufacturing the thin film magnetic head according to the invention is applied, that is, a method of forming the laminate including the main pole layer 12, the non-magnetic layer 13 and the auxiliary pole layer 14 will be described in detail below. In the descriptions of the method of manufacturing the thin film magnetic head and the method of forming the main part, the materials, forming positions and structural characteristics of components will not be further described, because they have been already described above.

The thin film magnetic head is manufactured through laminating each component in order mainly by use of a thin film process including a film formation technique such as sputtering and plating, a patterning technique such as photolithography, an etching technique such as dry etching and so on. In other words, at first, after the insulating layer 2 is formed on the substrate 1, the bottom shield layer 3, the shield gap film 4 burying the MR device 6, and the top shield layer 5 are laminated in this order on the insulating layer 2 so as to form the reproducing head 100A.

Next, after the non-magnetic layer 7 is formed on the reproducing head 100A, the return yoke 8, the gap layer 9 (the gap layer portions 9A, 9B and 9C) having the aperture 9K and burying the thin film coil 10, the yoke 11 coupled to the return yoke 8 in the aperture 9K, the main pole layer 12 magnetically coupled to the return yoke 8 through the yoke 11, the non-magnetic layer 13, the auxiliary pole layer 14 and the non-magnetic layer pattern 32P are laminated in this order on the non-magnetic layer 7 so as to form the recording head 100B.

Finally, after the overcoat layer 15 is formed on the recording head 100B, the air bearing surface 20 is formed through machining or polishing to complete the thin film magnetic head.

After a mask layer 31 for determining the widening width region R2 and a mask layer 33 for determining the uniform width region R1 are formed through separate steps, the main part of the thin film magnetic head is mainly formed through a series of patterning steps using the two different types of the mask layers 31 and 33.

Figure 11:
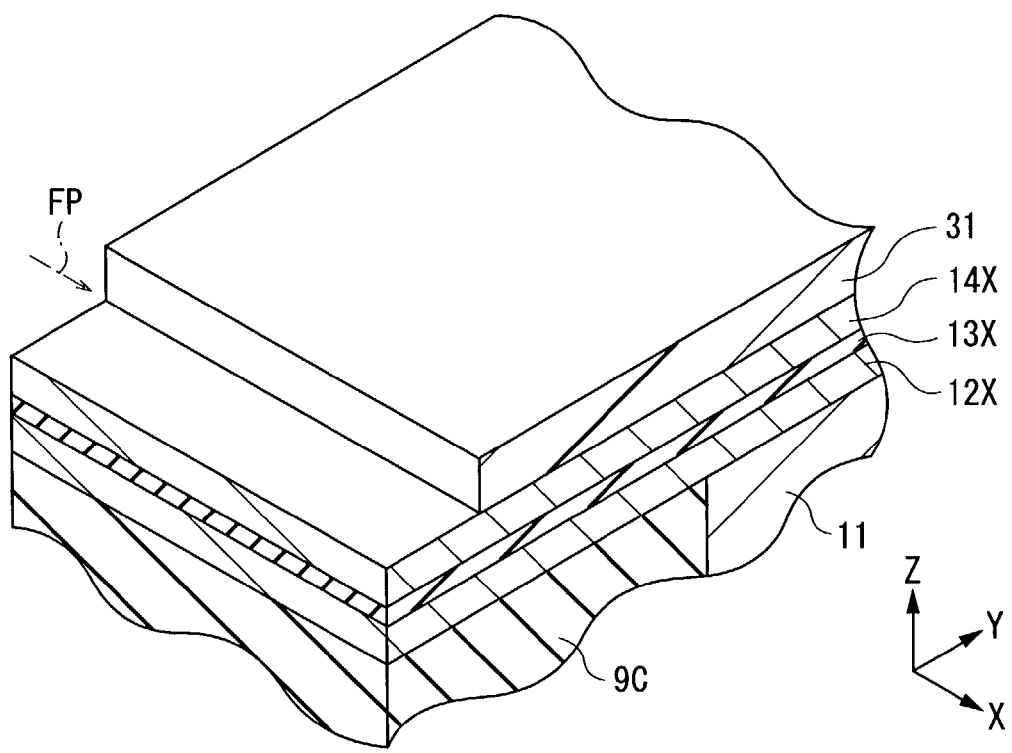
FIG. 11 is a perspective view corresponding to the sectional views shown in FIGS. 5A and 5B.

More specifically, after the yoke 11 is formed so that the yoke 11 and the gap layer portion 9C constitute the flat surface M, at first, as shown in FIGS. 5A, 5B and 11, a precursory main pole layer 12X made of a material with a high saturated magnetic flux density, a precursory non-magnetic layer 13X made of, for example, alumina or the like, and a precursory auxiliary pole layer 14X made of a material with a high saturated magnetic flux density are laminated in this order on the flat surface M through, for example, sputtering. The precursory main pole layer 12X is a preparatory layer which becomes the main pole layer 12 through patterning in a later step. Likewise, the precursory non-magnetic layer 13X and the precursory auxiliary pole layer 14X are preparatory layers which become the non-magnetic layer 13 and the auxiliary pole layer 14, respectively. As the material of the precursory main pole layer 12X, for example, a material with a saturated magnetic flux density equal to or higher than that of the material of the precursory auxiliary pole layer 14X is used. More specifically, for example, as the material of the precursory main pole layer 12X, an iron-cobalt based alloy (for example, FeCo, FeCoN and FeCoO) is used, and as the material of the precursory auxiliary pole layer 14X, Permalloy (Ni: 80% by weight, Fe: 20% by weight, or Ni: 45% by weight, Fe: 55% by weight) is used. Herein the precursory main pole layer 12X corresponds to a specific example of "a precursory main pole layer" in the invention, and the precursory non-magnetic layer 13X corresponds to a specific example of "precursory non-magnetic layer" in the invention, and further the precursory auxiliary pole layer 14X corresponds to a specific example of "a precursory auxiliary pole layer" in the invention.

Next, after a photoresist film (not shown) is formed on the precursory auxiliary pole layer 14X, the photoresist film is patterned through photolithography so as to selectively form the mask layer 31 for etching as shown in FIGS. 5A, 5B and 11. The mask layer 31 is formed so as to coat a region of the precursory auxiliary pole layer 14X disposed rearward of the flare point FP of the main pole layer 12 which is finally formed through adjusting an exposed area in the photoresist film during photolithography, that is, a region corresponding to the widening width region R2 (refer to FIG. 3). More specifically, for example, when the air bearing surface 20 is finally formed, the front edge of the mask layer 31 is aligned so as to be able to be recessed from the air bearing surface 20 by the recessed distance L (=approximately 0.2 $\mu$m to 1.0 $\mu$m). Herein, the mask layer 31 corresponds to a specific example of "a first mask layer" in the invention.

Figure 6B:
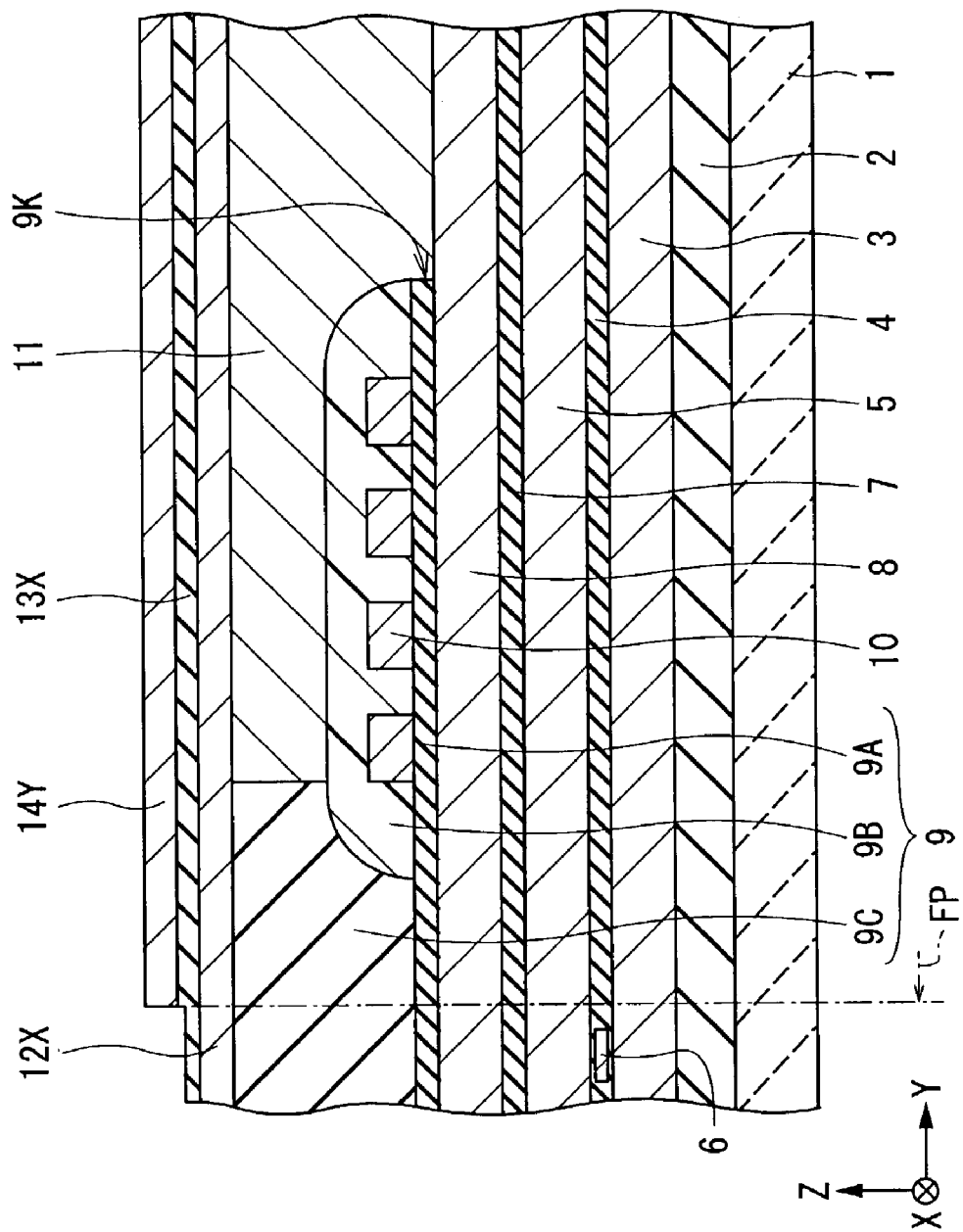
FIGS. 6A and 6B are sectional views for describing a step following the step of FIGS. 5A and 5B.
Figure 6A:
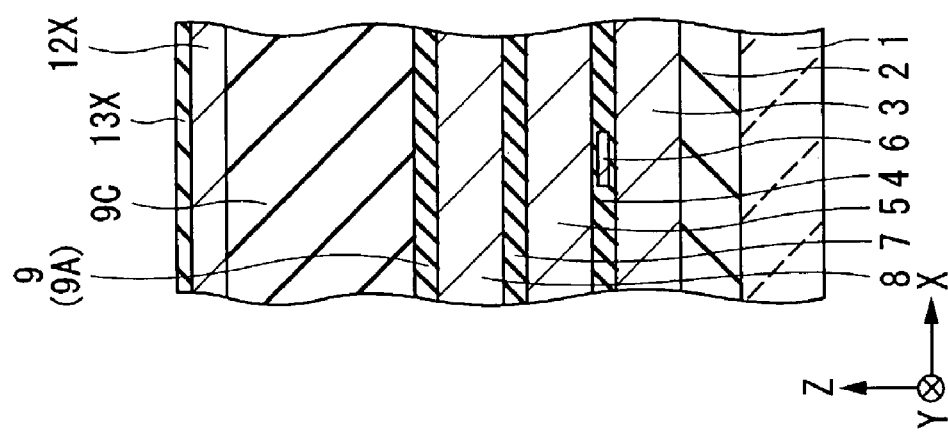
Figure 12:
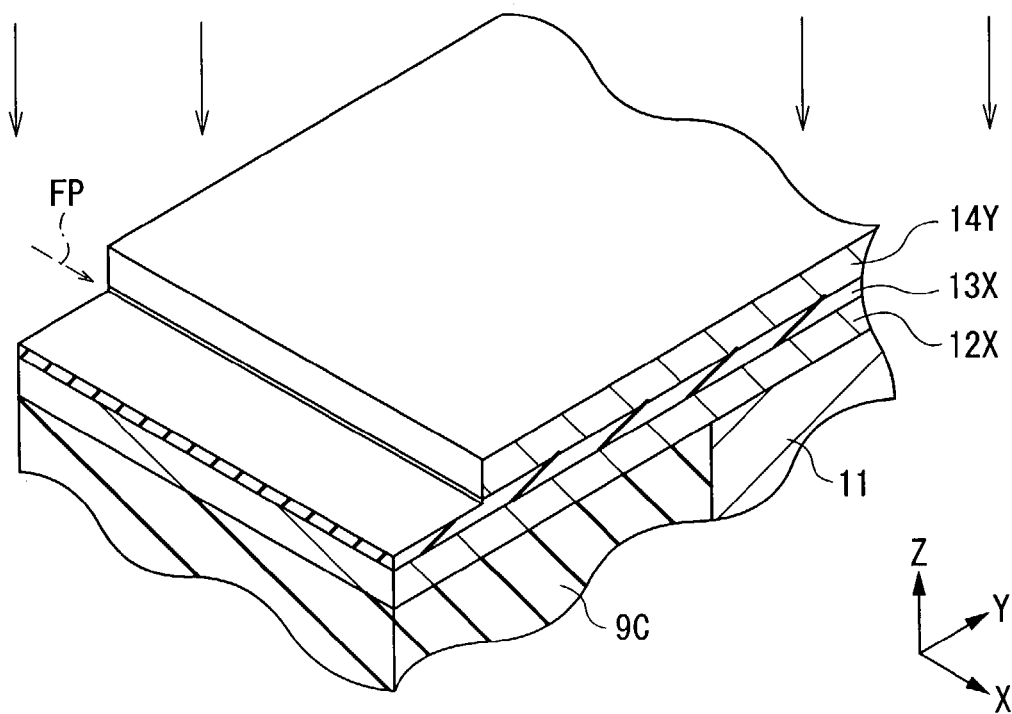
FIG. 12 is a perspective view corresponding to the sectional views shown in FIG. 6A and 6B.

Next, the whole surface is etched through, for example, ion milling by use of the mask layer 31 so as to pattern the precursory auxiliary pole layer 14X. A region of the precursory auxiliary pole layer 14X disposed frontward of the flare point FP is selectively removed through etching so as to form the precursory auxiliary pole layer pattern 14Y as shown in FIGS. 6A, 6B and 12. When the precursory auxiliary pole layer pattern 14Y is formed, for example, the mask layer 31 together with the precursory auxiliary pole layer 14X is etched, so the etching is carried on until the mask layer 31 is disappeared. In this case, in a region which is not coated by the mask layer 31, the precursory non-magnetic layer 13X made of alumina with a slow etching rate functions as a stopper layer, so in a region frontward of the flare point FP, after the precursory auxiliary pole layer 14X is removed, the precursory non-magnetic layer 13X is slightly etched and dug down. Thereby, etching is prevented from being excessively performed, so the precursory main pole layer 12X which is not a subject to be etched is prevented from being etched. In the above description, etching is carried on until the mask layer 31 is removed when forming the precursory auxiliary pole layer 14Y, but it is not necessarily limited to this. For example, in the case where the mask layer 31 still remains when etching is finished at the time when the precursory auxiliary pole layer 14Y is formed, additional etching may be performed so as to selectively remove the remained mask layer 31.

Figure 13:
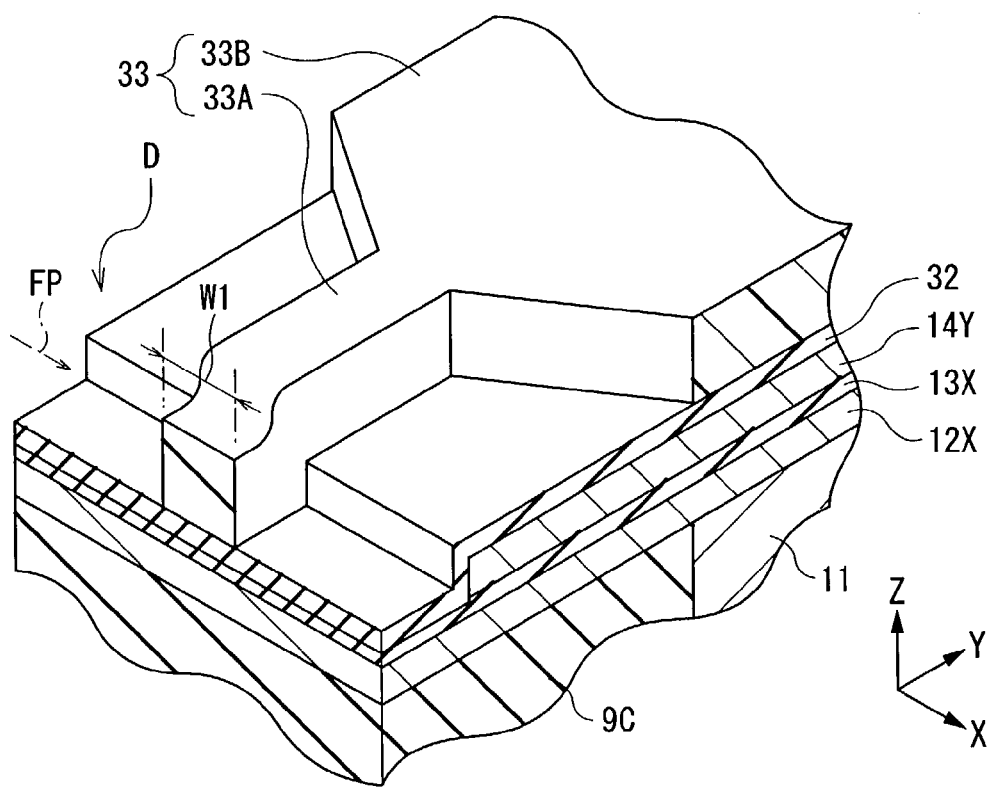
FIG. 13 is a perspective view corresponding to the sectional views shown in FIGS. 7A and 7B.

Next, as shown in FIGS. 7A, 7B and 13, the non-magnetic layer 32 made of, for example, alumina is formed through, for example, sputtering so as to coat an exposed surface of the precursory non-magnetic layer 13X and a surface of the precursory auxiliary pole layer pattern 14Y. The non-magnetic layer 32 is mainly used as a mask when the precursory auxiliary pole layer pattern 14Y, the precursory non-magnetic layer 13X and the precursory main pole layer 12X are patterned in a later step, and is formed so as to include a step portion D corresponding to a base structure comprising the precursory non-magnetic layer 13X and the precursory auxiliary pole layer pattern 14Y.

Then, as shown in FIGS. 7A, 7B and 13, the mask layer 33 for etching is selectively formed of a photoresist film through photolithography so as to coat the whole surface of the non-magnetic layer 32, that is, a region corresponding to both of the uniform width region R1 and the widening width region R2 (refer to FIG. 3). The mask layer 33 is formed in a pattern shape including a front portion 33A with the same uniform width W1 as the front end portion 14A and a rear portion 33B with a larger width than that of the front portion 33A substantially corresponding to, for example, a plane shape of the auxiliary pole layer 14 which is finally formed, and more specifically, the mask layer 33 is formed so that the front portion 33A extends to the rear from a position where the air bearing surface 20 is formed in a later step through the step portion D.

Figures 8A, 8B:
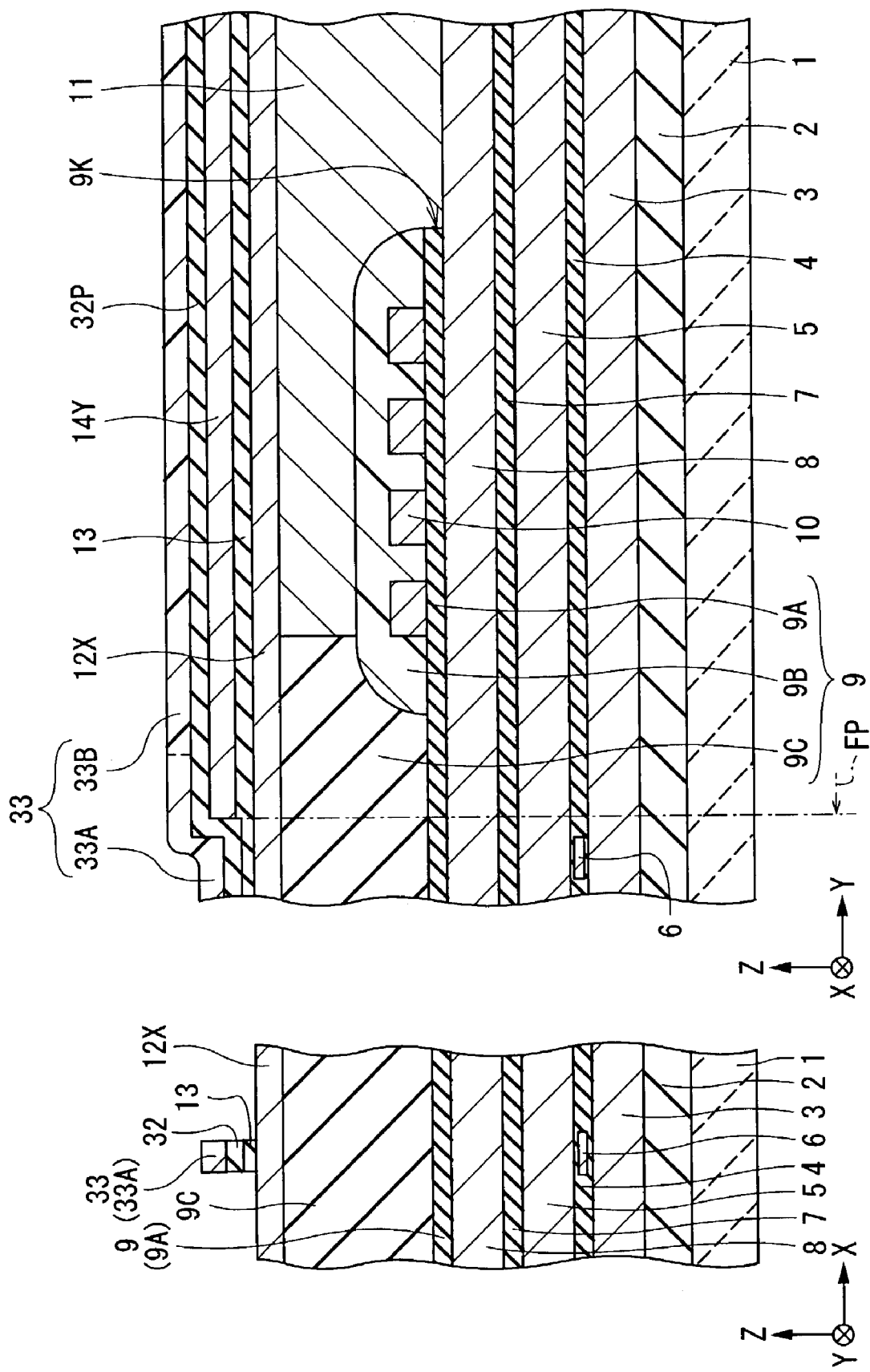
FIGS. 8A and 8B are sectional views for describing a step following the step of FIGS. 7A and 7B.
Figure 14:
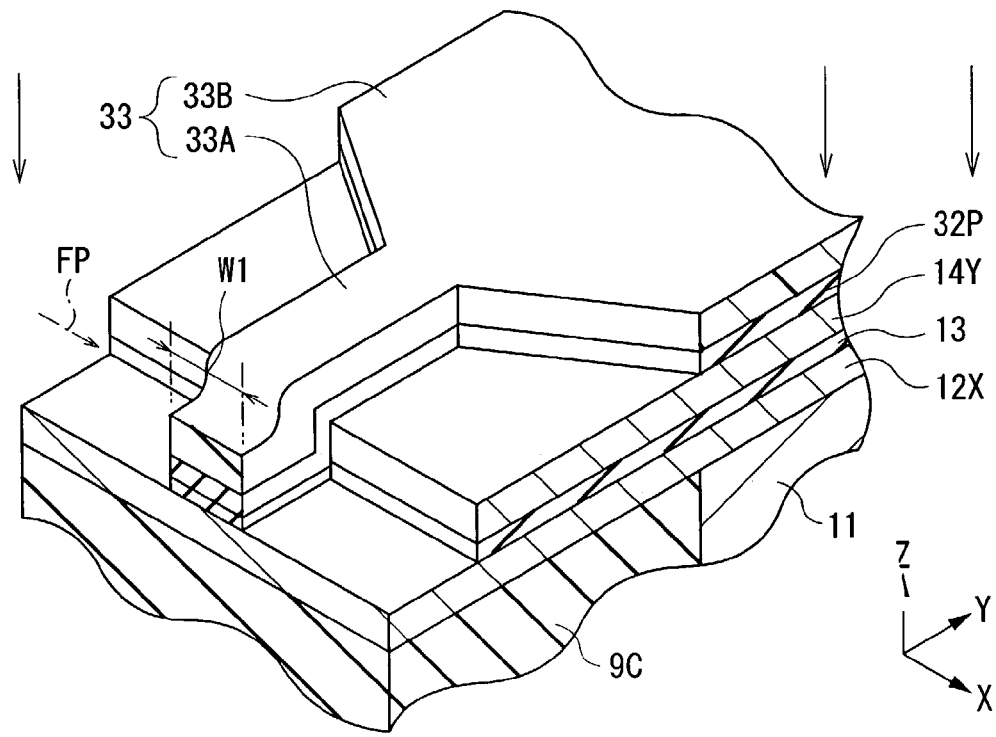
FIG. 14 is a perspective view corresponding to the sectional views shown in FIGS. 8A and 8B.

Then, the whole surface is etched through, for example, reactive ion etching (RIE) by use of the mask layer 33. As shown in FIGS. 8A, 8B and 14, the non-magnetic layer 32 is patterned through the etching so as to form substantially the same pattern shape as the mask layer 33, thereby the non-magnetic layer pattern 32P is formed. Herein, an aggregate of the mask layer 33 and the non-magnetic layer pattern 32P corresponds to a specific example of "a second mask layer" in the invention.

Next, the whole surface is etched through, for example, RIE by use of the mask layer 33, the non-magnetic layer pattern 32P and the precursory auxiliary pole layer pattern 14Y as masks so as to pattern the precursory non-magnetic layer 13X as shown in FIGS. 8A, 8B and 14. A region of the precursory non-magnetic layer 13X except for a portion corresponding to the front portion 33A of the mask layer 33 in a region frontward of the flare point FP is selectively removed through the etching so as to form the non-magnetic layer 13. The mask layer 33 itself is also etched through the etching so that the thickness thereof is reduced.

Figure 15:
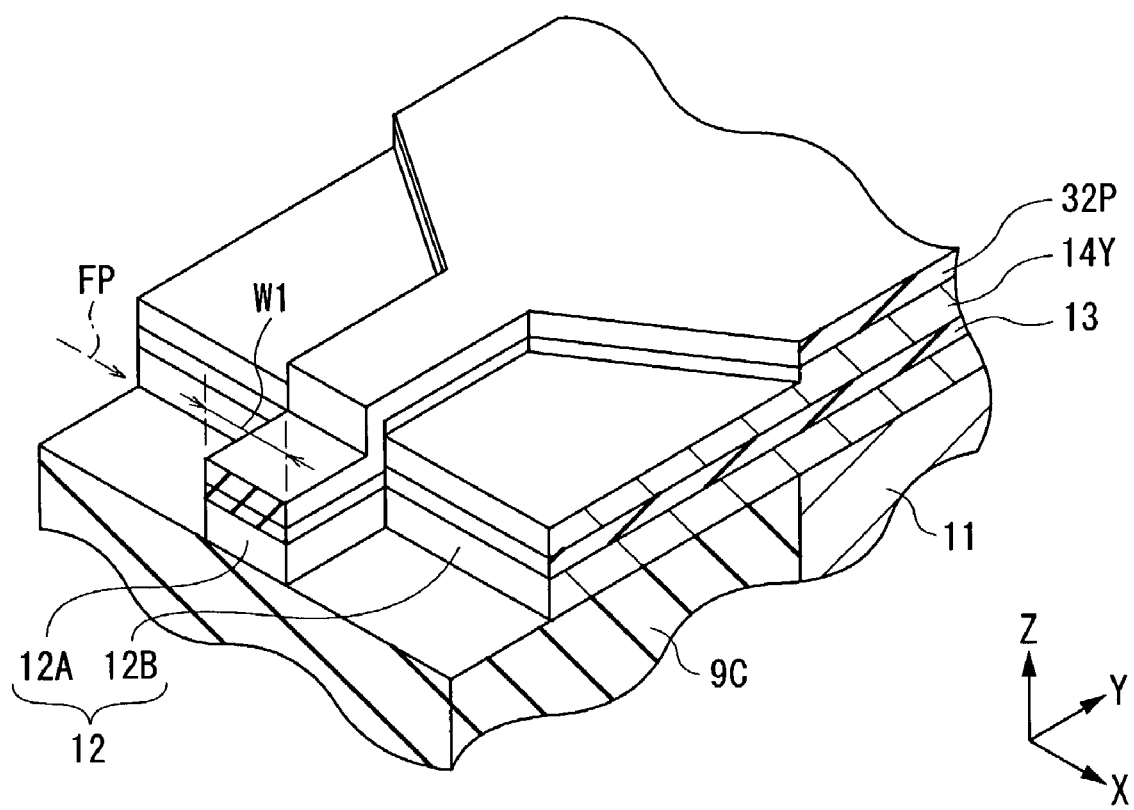
FIG. 15 is a perspective view corresponding to the sectional views shown in FIGS. 9A and 9B.

Then, the whole surface is continued to be etched through, for example, ion milling by use of the mask layer 33, the non-magnetic layer pattern 32P, the precursory auxiliary pole layer pattern 14Y and the non-magnetic layer 13 as masks so as to pattern the precursory main pole layer 12X. A region of the precursory main pole layer 12X except for a portion corresponding to the front portion 33A in a region frontward of the flare point FP is selectively removed through the etching, thereby, as shown in FIGS. 9A, 9B and 15, the main pole layer 12 is formed so as to include the front end portion 12A and the rear end portion 12B magnetically coupled to each other at the flare point FP. At this time, a region of the precursory auxiliary pole layer pattern 14Y except for a portion corresponding to the mask layer 33 in a region rearward of the flare point FP is selectively dug down in partway through etching. FIGS. 9A, 9B and 15 show a state that the mask layer 33 is disappeared through etching so that the non-magnetic layer pattern 32P is exposed.

Finally, by use of the non-magnetic layer pattern 32P as a mask, the whole surface is continued to be etched so that the precursory auxiliary pole layer pattern 14Y is patterned. A region of the precursory auxiliary pole layer pattern 14Y except for a portion corresponding to the non-magnetic layer pattern 32P in a region rearward of the flare point FP is selectively removed, thereby as shown in FIGS. 10A, 10B and 2, the auxiliary pole layer 14 is formed so as to include the front end portion 14A and the rear end portion 14B in order from the flare point FP. Further, a region of the non-magnetic layer 13 except for a portion corresponding to the non-magnetic layer pattern 32P in a region rearward of the flare point FP is selectively dug down in partway. Through etching, the non-magnetic layer pattern 32P is etched to be reduced, and the gap layer portion 9C in the neighborhood of the front end portion 12A in a region frontward of the flare point FP is selectively dug down. Thereby, the laminate including the main pole layer 12, the non-magnetic layer 13 and the auxiliary pole layer 14 is completed.

In the above paragraphs, for convenience in description, it is described that the main pole layer 12, the non-magnetic layer 13 and the auxiliary pole layer 14 are completed at the time when patterning though etching is completed, however, in actuality, after patterning of the precursory main pole layer 12X, the precursory non-magnetic layer 13X and the precursory auxiliary pole layer pattern 14Y is completed, the main pole layer 12, the non-magnetic layer 13 and the auxiliary pole layer 14 are finally completed through a step of forming the air bearing surface 20.

As described above, in the method of manufacturing the thin film magnetic head according to the embodiment, in order to form the laminate including the main pole layer 12, the non-magnetic layer 13 and the auxiliary pole layer 14, two different types of mask layers 31 and 33 are used to perform a series of patterning steps, so the thin film magnetic head in which highly accurate formation of the main pole layer 12 and proper positioning of a flare point are compatible, and which can contribute to an improvement in recording performance can be manufactured because of the following reason.

In the embodiment, in a step of forming the main pole layer 12, when the precursory main pole layer 12X is patterned, the mask layer 31 is used as a mask for forming the rear end portion 12B, and the mask layer 33 is used as a mask for forming the front end portion 12A. In this case, when the main pole layer 12 is formed, the widening width region R2 is determined by the mask layer 31 so that the flare point FP is determined, and the uniform width region R1 is determined by the mask layer 33 (front portion 33A) so that a processed width W1 of the front end portion 12A is determined. In other words, the flare point FP and the processed width W1 of the front end portion 12A are independently determined by use of the mask layers 31 and 33 which are different from each other. Thereby, when a position where the mask layer 31 is disposed is changed, the flare point FP can be freely set so as to have a desired recessed distance L. Moreover, when the mask layer 33 is formed, the rear portion 33B with a wider width is recessed from the flare point FP, thereby a region where reflected light inducing an increase in an exposed region can reach can be kept only in a rear region of the front portion 33A, thereby the reflected light can be prevented from reaching the front region of the front portion 33A. Therefore, in the embodiment, unlike the conventional thin film magnetic head described above, an influence of the reflected light during photolithography is prevented so as to control the processed width W1 of the front end portion 12A with high accuracy, and the flare point FP is adjusted to control a position where the magnetic flux is focused, thereby these two advantages are compatible, so from the viewpoint of manufacturing the thin film magnetic head, the embodiment can contribute to an improvement in recording performance.

Moreover, in the embodiment, as an etching technique for patterning the non-magnetic layer 32 so as to form the non-magnetic layer pattern 32P, RIE is used, so compared with other techniques such as, for example, ion milling, time required to form the non-magnetic layer pattern 32P can be shortened. It is because, in general, RIE has a higher etching rate than ion milling, and is superior in processing a relatively hard material to ion milling, so RIE is more suitable as a technique for etching the non-magnetic layer 32 made of, for example, a hard material such as alumina than ion milling.

In the embodiment, as an etching technique for patterning, ion milling or RIE is used, but it is not necessarily limited to this. For example, RIE may be used instead of ion milling, or ion milling may be used instead of RIE. Further, only either of ion milling or RIE may be used for all patterning steps.

Moreover, in the embodiment, after the precursory auxiliary pole layer 14X is formed, the precursory auxiliary pole layer 14X is patterned by use of the mask layers 31 and 33 to form the auxiliary pole layer 14, but it is not necessarily limited to this. For example, instead of the above forming technique, the auxiliary pole layer 14 may be formed through plating.

[Second Embodiment]

Next, a second embodiment of the invention will be described below.

Figures 16A, 16B:
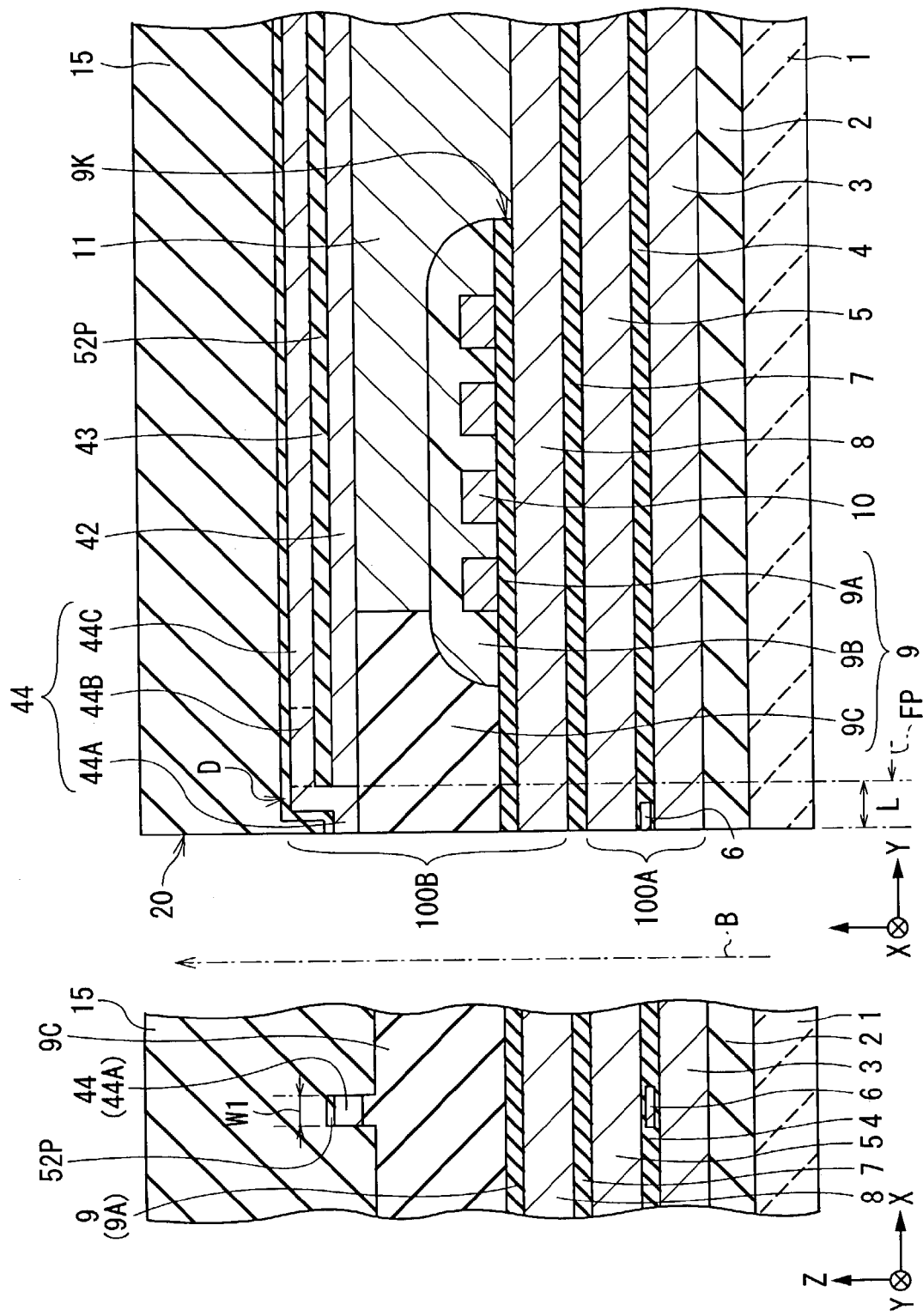
FIGS. 16A and 16B are sectional views of a thin film magnetic head according to a second embodiment of the invention.
Figure 17:
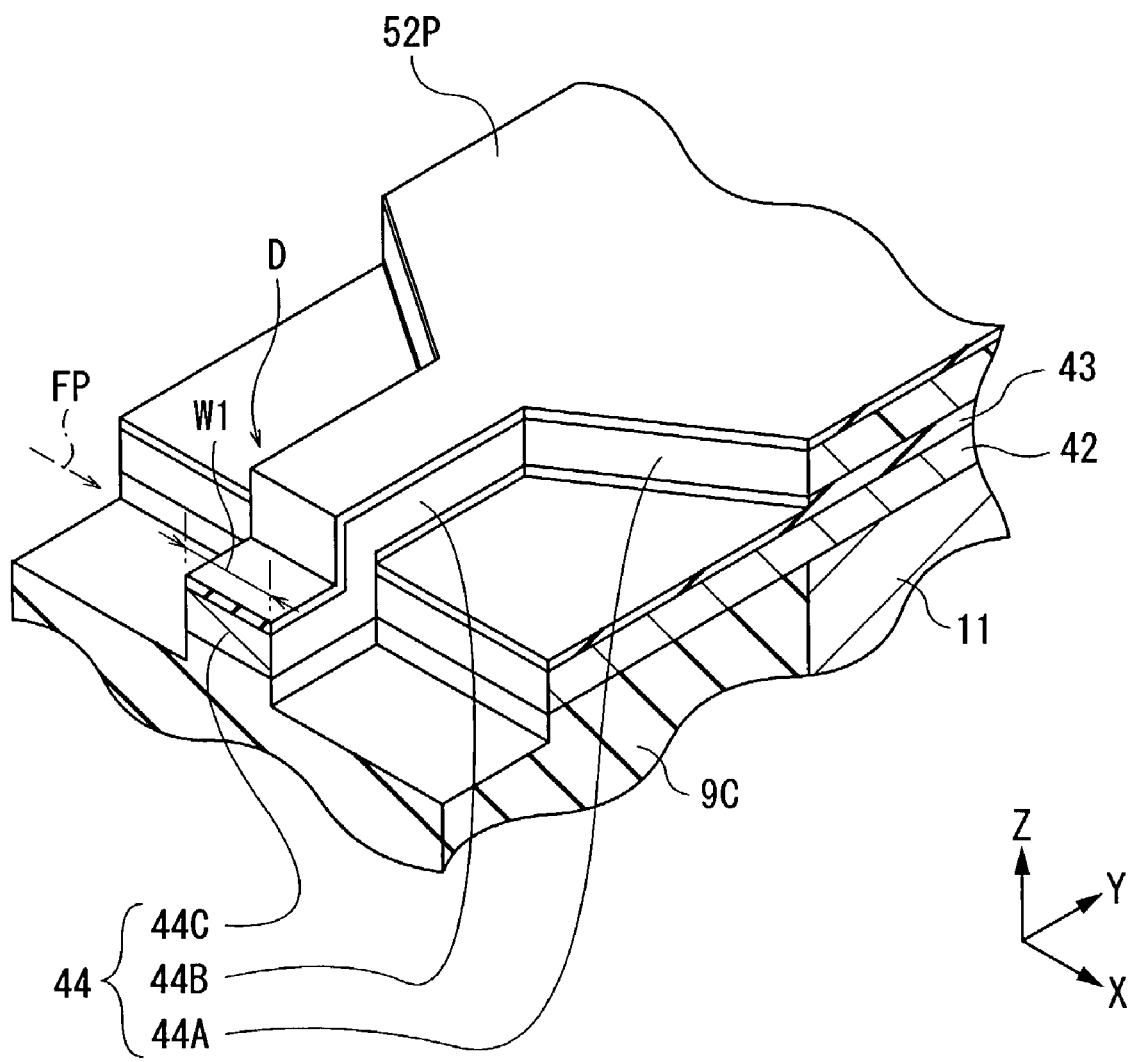
FIG. 17 is an enlarged perspective view of a main part of the thin film magnetic head shown in FIGS. 16A and 16B.
Figure 18:
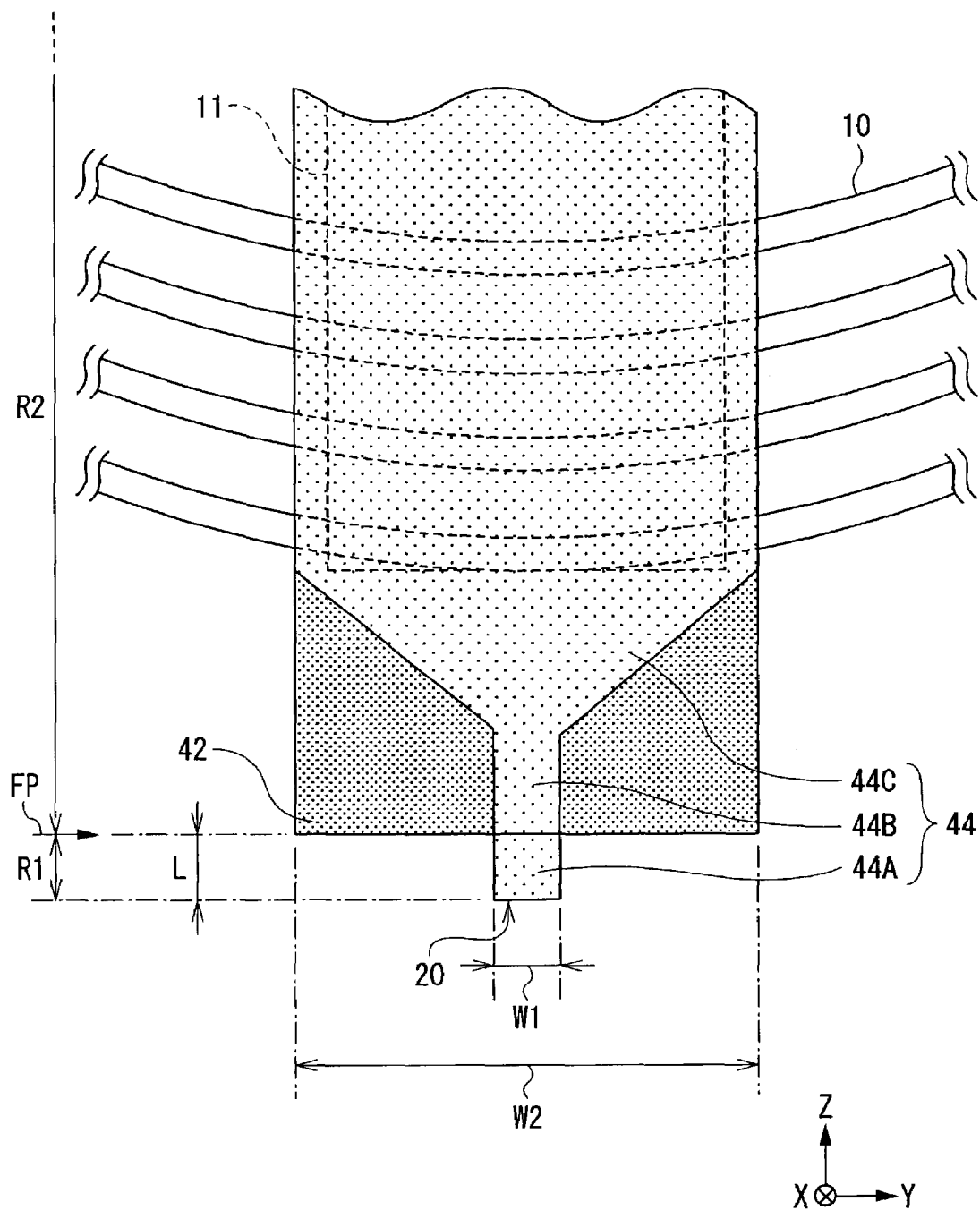
FIG. 18 is an enlarged plan view of the main part of the thin film magnetic head shown in FIGS. 16A and 16B.

FIGS. 16A and 16B show sectional views of a thin film magnetic head according to the embodiment. FIG. 16A shows a sectional view parallel to the air bearing surface, and FIG. 16B shows a sectional view perpendicular to the air bearing surface. FIGS. 17 and 18 show an enlarged perspective view and an enlarged plan view of a main part of the thin film magnetic head shown in FIGS. 16A and 16B.

The thin film magnetic head has a structure equivalent to that of the first embodiment except that the recording head 100B comprises a laminate including an auxiliary pole layer 42, a non-magnetic layer 43 and a main pole layer 44 instead of the laminate including the main pole layer 12, the non-magnetic layer 13 and the auxiliary pole layer 14 described in the first embodiment, and a non-magnetic layer pattern 52P instead of the non-magnetic layer pattern 32P. In FIG. 18, the non-magnetic layer 43 and the non-magnetic layer pattern 52P are not shown, and in order to draw a clear distinction between the auxiliary pole layer 42 and the main pole layer 44, the auxiliary pole layer 42 is indicated by dark hatching, and the main pole layer 44 is indicated by light hatching. Herein, the laminate including the auxiliary pole layer 42, the non-magnetic layer 43 and the main pole layer 44 in this order corresponds to a specific example of "a pole layer" in the invention.

The laminate including the auxiliary pole layer 42, the non-magnetic layer 43 and the main pole layer 44 in this order has the same plane structure as that of the laminate (including the main pole layer 12, the non-magnetic layer 13 and the auxiliary pole layer 14) described in the first embodiment. In other words, as shown in FIG. 18, the laminate has a plane shape including the uniform width region R1 with the uniform width W1 and the widening width region R2 with a larger width W2 than that of the uniform width region R1, and specifically, the auxiliary pole layer 42 and the main pole layer 44 have plane shapes which are different from each other. Moreover, in the laminate, as shown in FIGS. 16A and 16B, a step in the main pole layer 44 in the thickness direction is formed at the flare point FP.

The auxiliary pole layer 42 is provided mainly to have the same function as the rear end portion 12B of the main pole layer 12 in the first embodiment, that is, the auxiliary pole layer 42 is a main magnetic flux containing portion for containing the magnetic flux generated in the thin film coil 10. The auxiliary pole layer 42 is made of, for example, a material with a smaller saturated magnetic flux density than that of the main pole layer 44, and is recessed by the recessed distance L (=approximately $0.2\,\mu m$ to $1.0\,\mu m$) from the air bearing surface 20. The auxiliary pole layer 42 has a larger width W2 than the width W1 of a front end portion 44A to be described later which constitutes the main pole layer 44 (W2>W1), and the flare point FP is determined by a front edge of the auxiliary pole layer 42.

The non-magnetic layer 43 is made of the same material as the non-magnetic layer 13 in the first embodiment and has the same structural characteristics as the non-magnetic layer 13. The non-magnetic layer 43 functions as a stopper layer during etching as in the case of the non-magnetic layer 13.

The main pole layer 44 extends rearward from the air bearing surface 20, and comprises three portions magnetically coupled to one another, that is, the front end portion 44A, a middle portion 44B and a rear end portion 44C in order from the air bearing surface 20. The main pole layer 44 is made of a material with a higher saturated magnetic flux density than that of the auxiliary pole layer 42.

The front end portion 44A has the same function as the front end portion 12A of the main pole layer 12 in the first embodiment, that is, the front end portion 44A is a main magnetic flux emitting portion for emitting the magnetic flux to outside. The front end portion 44A has the uniform width W1 which determines the recording track width of the recording medium, and the uniform width region R1 is determined by a plane shape of the front end portion 44A. The middle portion 44B and the rear end portion 44C have the same functions as those of the front end portion 14A and the rear end portion 14B of the auxiliary pole layer 14 in the first embodiment, respectively, that is, they are portions which become an auxiliary flow path of magnetic flux. The middle portion 44B has the same uniform width W1 as the front end portion 44A, and the rear end portion 44C has a width which gradually increases in a front portion and a uniform width (for example, W2) in a rear portion.

As shown in FIGS. 16A and 16B, as the front end portion 44A is disposed on the gap layer portion 9C, and the middle portion 44B and the rear end portion 44C are disposed on the auxiliary pole layer 42 and the non-magnetic layer 43, the main pole layer 44 has a step in the neighborhood of the flare point FP. The auxiliary pole layer 42 is connected with the main pole layer 44 at the flare point FP. In other words, in the viewpoint of a positional relationship between the auxiliary pole layer 42 and the main pole layer 44 with reference to a position where the non-magnetic layer 43 is disposed, the rear end portion 44C of the main pole layer 44 is disposed on the medium-outgoing side in the thickness direction, on the other hand, the auxiliary pole layer 42 is disposed on the medium-incoming side in the thickness direction. Herein, the front end portion 44A, the middle portion 44B and the rear end portion 44C correspond to specific examples of "a third main pole layer portion", "a fourth main pole layer portion" and "a fifth main pole layer portion" in the invention, respectively.

The non-magnetic layer pattern 52P is made of the same material as that of the non-magnetic layer pattern 32P in the first embodiment, and has the same structural characteristics as the non-magnetic layer pattern 32P. The non-magnetic layer pattern 52P has the same function as a stopper layer during etching as the non-magnetic layer pattern 32P.

Next, referring to FIGS. 16A through 18, actions of the thin film magnetic head will be described below.

In the thin film magnetic head, when the magnetic flux is generated in the thin film coil 10, the magnetic flux is contained mainly in the auxiliary pole layer 42, and is also contained in the main pole layer 44 through the non-magnetic layer 43. The magnetic flux contained in the auxiliary pole layer 42 flows into the front end portion 44A through a connecting portion with the main pole layer 44, and the magnetic flux contained in the main pole layer 44 flows into the front end portion 44A from the rear end portion 44C through the middle portion 44B likewise. At this time, the magnetic flux flowing from the auxiliary pole layer 42 with a wider width W2 to the front end portion 44A with a narrower width W1 (W1<W2) is focused on the flare point FP. Thereby, the magnetic flux is concentrated mainly on a portion of the front end portion 44A on the trailing side. The magnetic flux is emitted from the front end portion 44A to outside so as to generate a perpendicular magnetic field, and the perpendicular magnetic field magnetizes the recording medium so as to record information on the recording medium.

The thin film magnetic head according to the embodiment comprises a laminate including the auxiliary pole layer 42 and the main pole layer 44 disposed in a region facing the auxiliary pole layer 42 with the non-magnetic layer 43 in between. More specifically, in the thin film magnetic head, the main pole layer 44 is disposed on the auxiliary pole layer 42 and the non-magnetic layer 43 so that the main pole layer 44 has a step, and the auxiliary pole layer 42 is connected with the main pole layer 44 at the flare point FP. In this case, mainly the auxiliary pole layer 42, the front end portion 44A and an aggregate of the middle portion 44B and the rear end portion 44C in the auxiliary pole layer 42 and the main pole layer 44 have the same functions as those of the rear end portion 12B, the front end portion 12A and the auxiliary pole layer 14 in the main pole layer 12 and the auxiliary pole layer 14 in the first embodiment, respectively. Thereby, "a main magnetic flux incoming route" from the auxiliary pole layer 42 to the front end portion 44A and "an auxiliary magnetic flux incoming route" from the rear end portion 44C to the front end portion 44A through the middle portion 44B in the main pole layer 44 can be obtained, so the magnetic flux is concentrated on a portion of the front end portion 44A on the trailing side. Therefore, also in the embodiment, the generation intensity of the perpendicular magnetic field can be obtained by the same effects as those of the first embodiment, so the recording performance can be improved.

Figure 19:
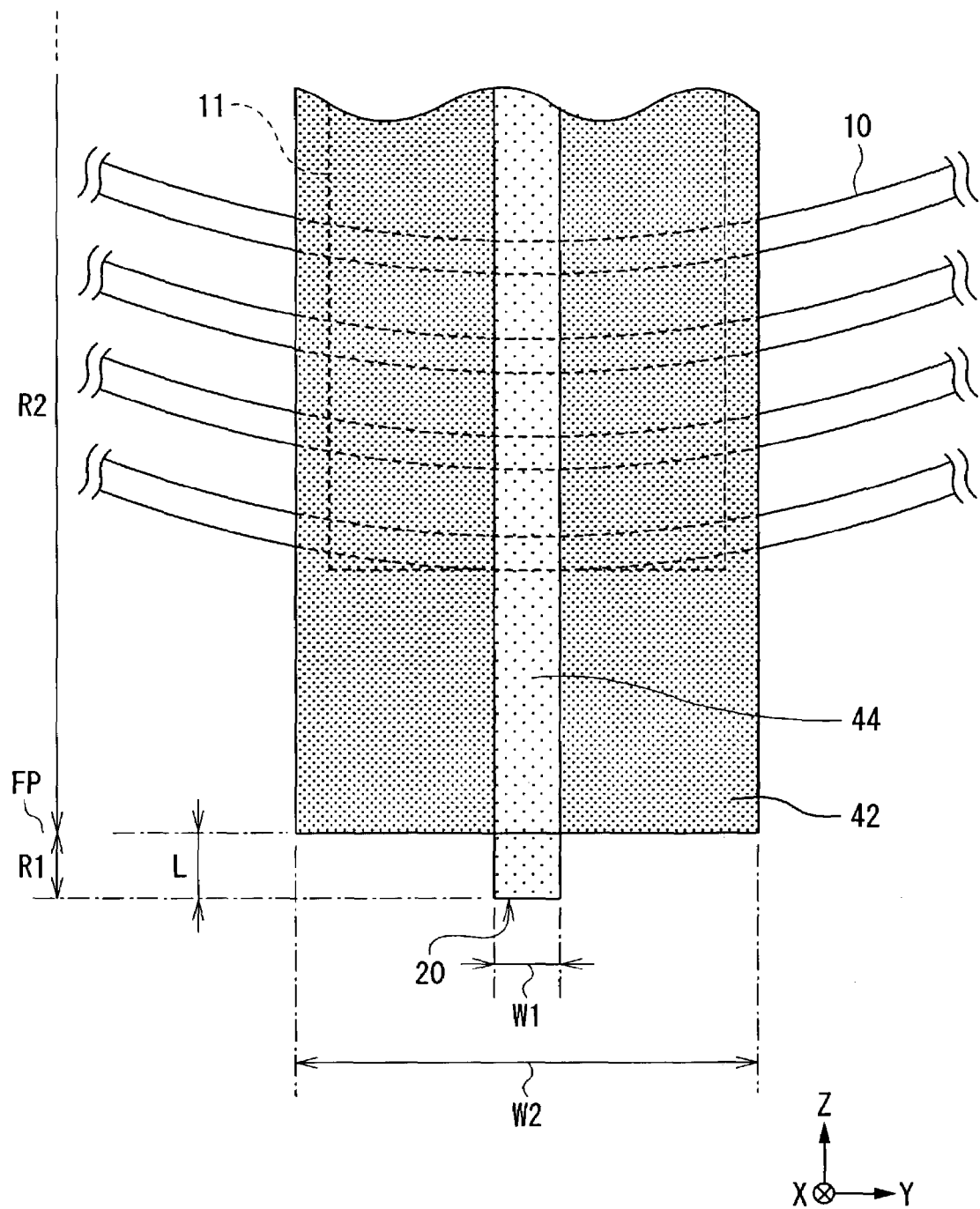
FIG. 19 is a plan view of a modification to the main part of the thin film magnetic head shown in FIG. 18.

In the embodiment, the rear end portion 44C of the main pole layer 44 has a larger width than the width W1 of the front end portion 44A and the middle portion 44B, but it is not necessarily limited to this. For example, the rear end portion 44C may have the same width W1 as the front end portion 44A and the middle portion 44B so that the whole main pole layer 44 may have the uniform width W1 as shown in FIG. 19. Also in this case, "the auxiliary magnetic flux incoming route" can be secured in the middle portion 44B and the rear end portion 44C, so the same effects as those in the second embodiment can be obtained. The main part of the thin film magnetic head shown in FIG. 19 is equivalent to that shown in FIG. 18, except for the above characteristic part.

Next, referring FIGS. 16A through 18, 20A through 28, a method of manufacturing the thin film magnetic head according to the embodiment will be described below. FIGS. 20A through 24B show sectional views of each step in the method of manufacturing the thin film magnetic head, and FIGS. 25 through 28 show perspective views corresponding to FIGS. 20A and 20B through 23A and 23B, respectively. Only a method of forming a main part of the thin film magnetic head to which the method of manufacturing the thin film magnetic head according to the invention is applied, that is, a method of forming the laminate including the auxiliary pole layer 42, the non-magnetic layer 43 and the main pole layer 44 will be described below, and in the description, materials, forming positions and structural characteristics of components will not be further described.

The main part of the thin film magnetic head according to the embodiment is formed through a series of patterning steps using two types of masks which are different from each other, that is, a mask layer 51 for determining the widening width region R2 and a mask layer 53 for determining the uniform width region R1 as in the case of the first embodiment.

Figure 20B:
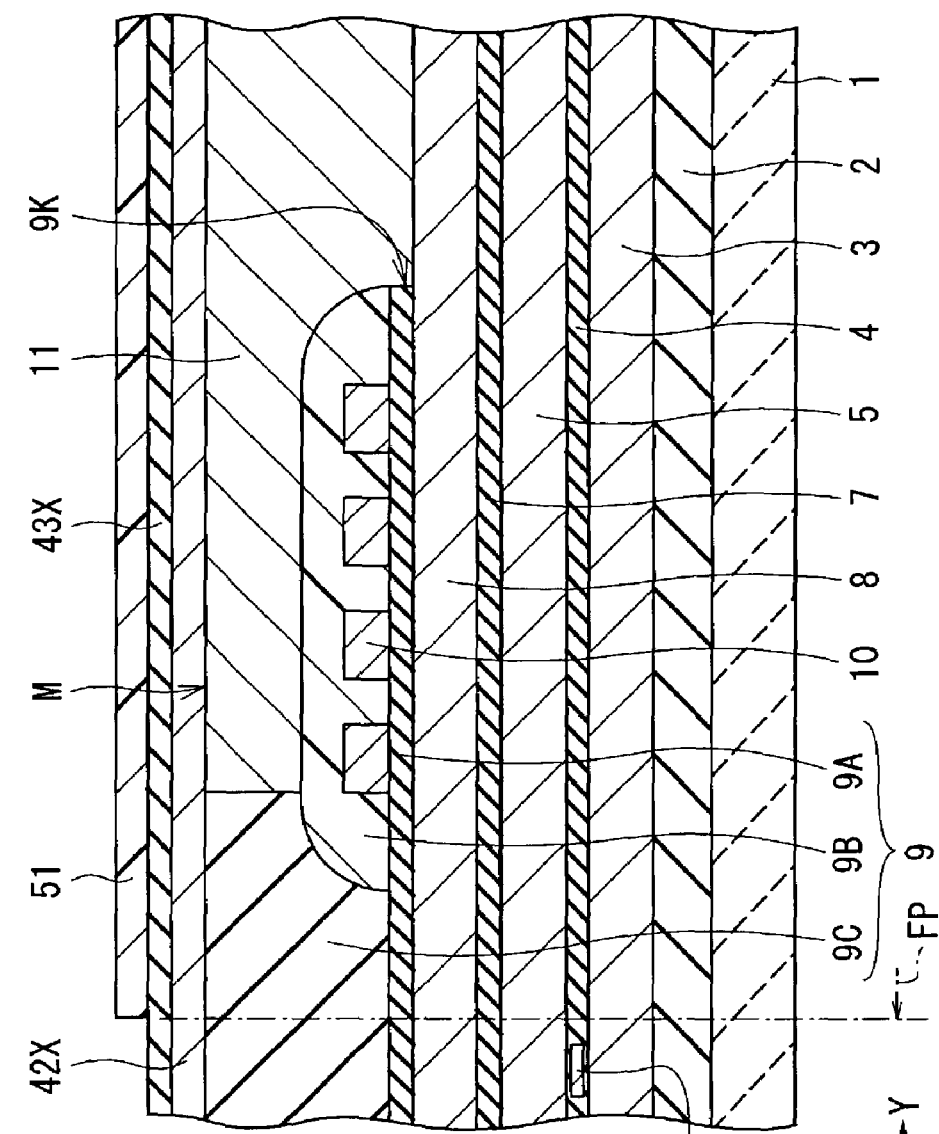
FIGS. 20A and 20B are sectional views for describing one step in a method of manufacturing the thin film magnetic head according to the second embodiment of the invention.
Figure 20A:
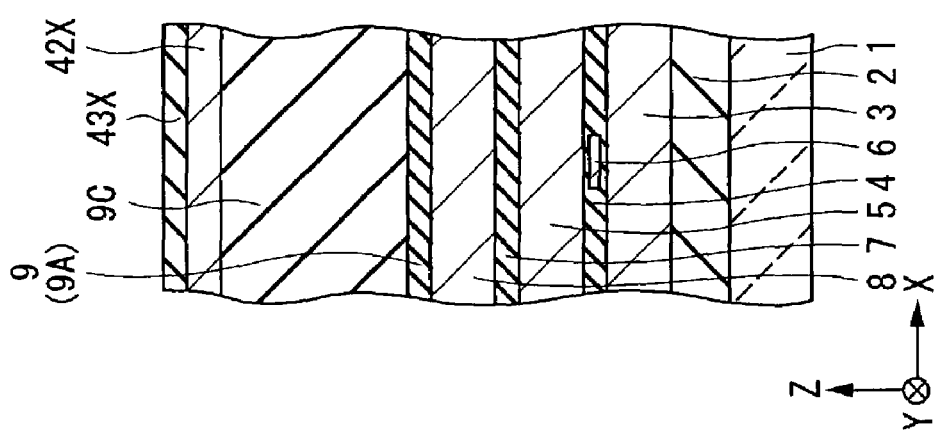
Figure 25:
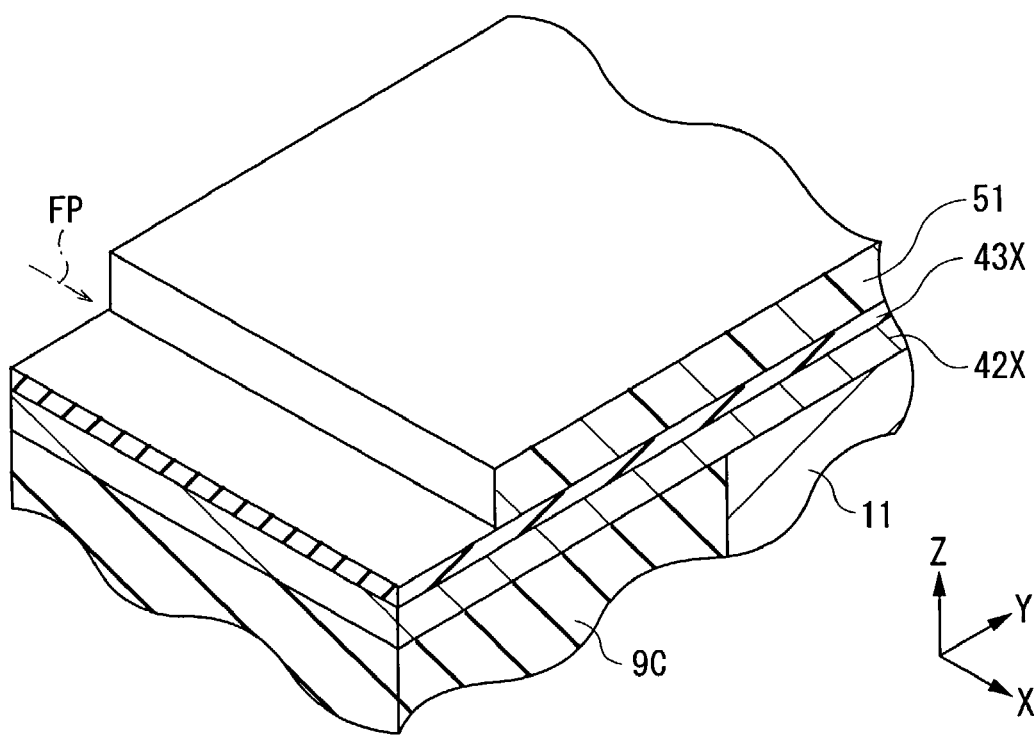
FIG. 25 is a perspective view corresponding to the sectional views shown in FIGS. 20A and 20B.

More specifically, after the yoke 11 is formed so that the yoke 11 and the gap layer portion 9C constitute the flat surface M, at first, as shown in FIGS. 20A, 20B and 25, a precursory auxiliary pole layer 42X made of a material with a high saturated magnetic flux density, and a precursory non-magnetic layer 43X made of, for example, alumina or the like are laminated in this order on the flat surface M through, for example, sputtering. As the material of the precursory auxiliary pole layer 42X, a material with a smaller saturated magnetic flux density than that of the material of the precursory main pole layer 44X to be formed in a later step is used, and more specifically, Permalloy (Ni: 80% by weight, Fe: 20% by weight or Ni: 45% by weight, Fe: 55% by weight), a nickel-iron-chromium alloy or the like is used. The precursory auxiliary pole layer 42X is a preparatory layer which becomes the auxiliary pole layer 42 through patterning in a later step, and the precursory non-magnetic layer 43X is a preparatory layer which becomes the non-magnetic layer 43 through patterning in a later step likewise. Herein, the precursory auxiliary pole layer 42X corresponds to a specific example of "a precursory auxiliary pole layer" in the invention, and the precursory non-magnetic layer 43X corresponds to a specific example of "a precursory non-magnetic layer" in the invention.

Next, after a photoresist film (not shown) is formed on the precursory non-magnetic layer 43X, the photoresist film is patterned through photolithography so as to selectively form the mask layer 51 for etching as shown in FIGS. 20A, 20B and 25. The mask layer 51 is formed so as to coat the widening width region R2 (refer to FIG. 18) through adjusting an exposed area in the photoresist film during photolithography so as to align the front edge of the mask layer 51 to the flare point FP. Herein, the mask layer 51 corresponds to a specific example of "a first mask layer" in the invention.

Figure 21B:
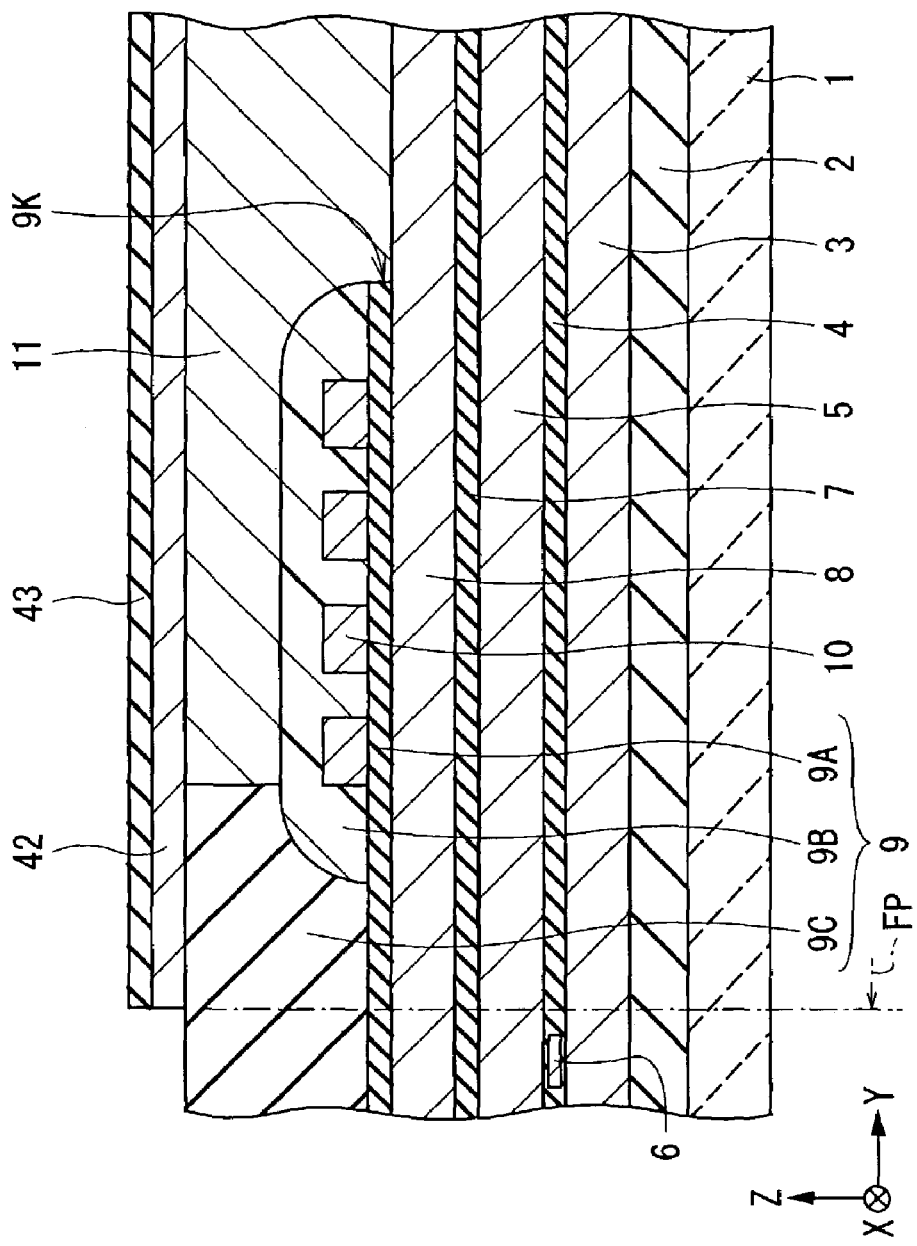
FIGS. 21A and 21B are sectional views for describing a step following the step of FIGS. 20A and 20B.
Figure 21A:
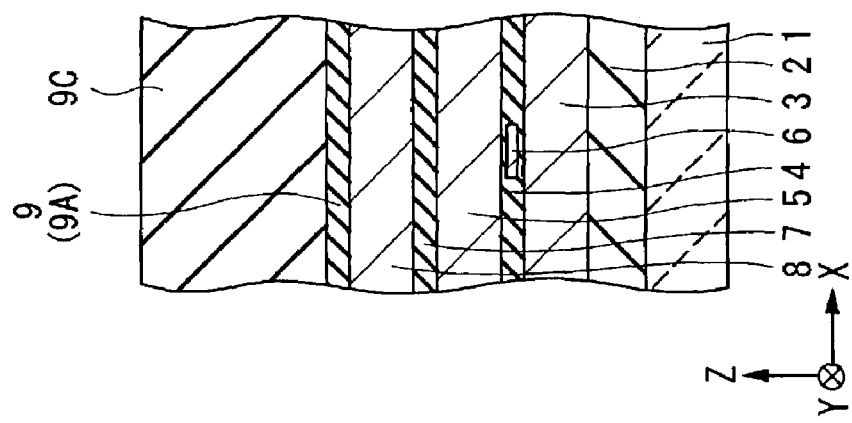
Figure 26:
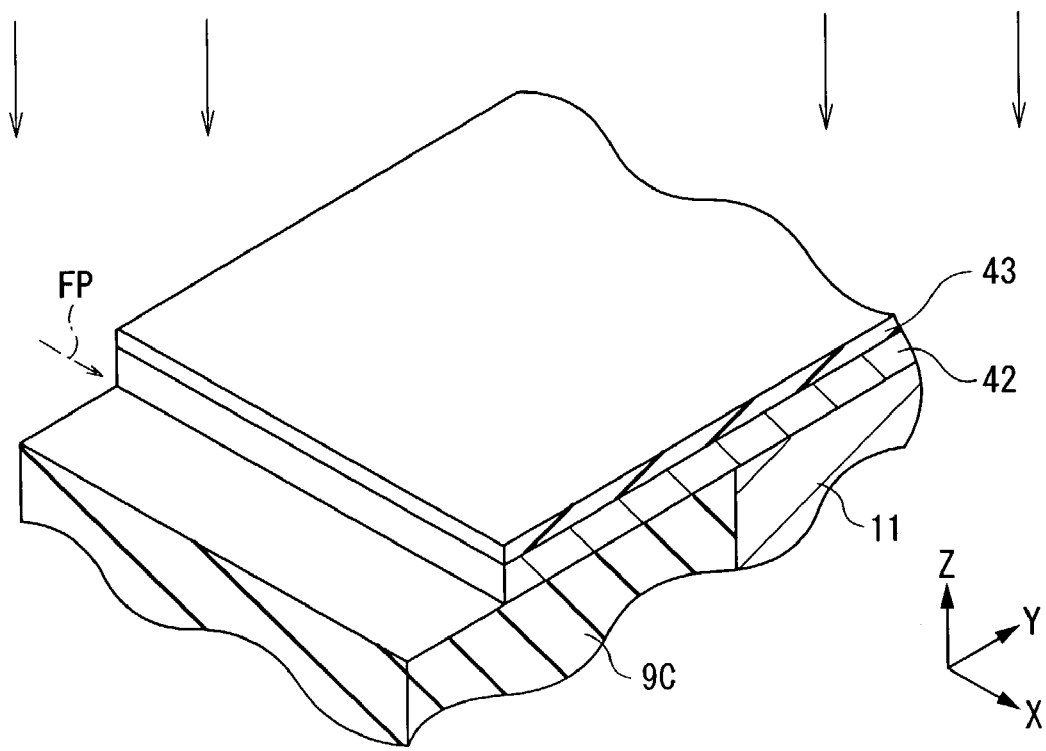
FIG. 26 is a perspective view corresponding to the sectional views shown in FIGS. 21A and 21B.

Then, the whole surface is etched through, for example, RIE by use of the mask layer 51 so as to pattern the precursory non-magnetic layer 43X. A region of the precursory non-magnetic layer 43X disposed frontward of the flare point FP is selectively removed through etching so as to form the non-magnetic layer 43 as shown in FIGS. 21A and 26.

Next, the whole surface is etched through, for example, ion milling by use of the mask layer 51 so as to pattern the precursory auxiliary pole layer 42X. As in the case of patterning the precursory non-magnetic layer 43X, a region of the precursory auxiliary pole layer 42X disposed frontward of the flare point FP is selectively removed through etching so as to form the auxiliary pole layer 42 as shown in FIGS. 21A and 26. When the auxiliary pole layer 42 is formed, for example, the mask layer 51 together with the precursory auxiliary pole layer 42X is etched, so the etching is carried on until the mask layer 51 disappears. In this case, in a region coated by the mask layer 51, the non-magnetic layer 43 made of alumina with a slow etching rate functions as a stopper layer, so after the mask layer 51 disappears, etching is prevented from being excessively performed. Thereby, a non-etching region (a region which becomes the auxiliary pole layer 42) in the precursory auxiliary pole layer 42X is prevented from being etched, so the auxiliary pole layer 42 can be prevented from being reduced.

Figures 22A, 22B:
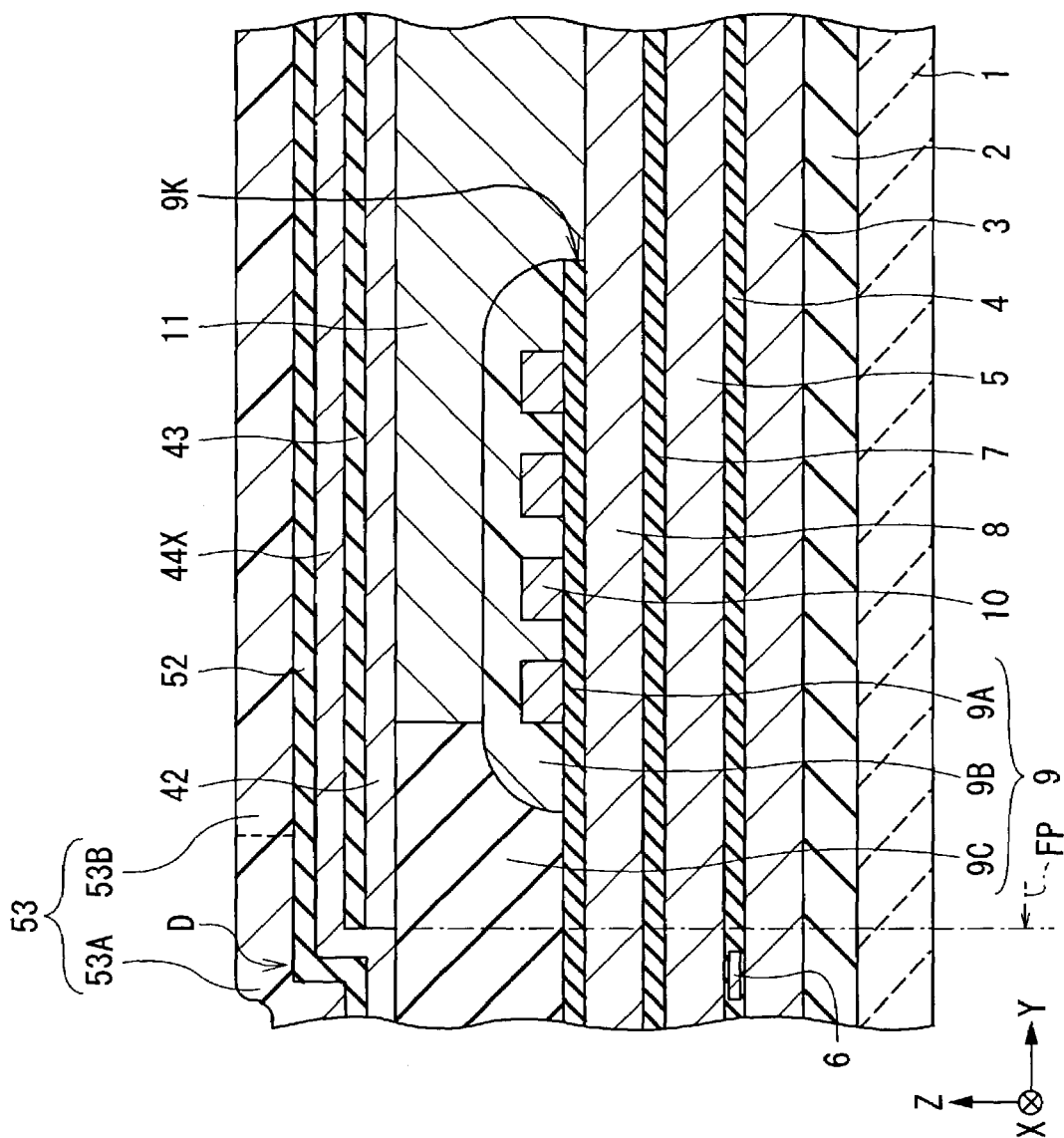
FIGS. 22A and 22B are sectional views for describing a step following the step of FIGS. 21A and 21B.
Figure 27:
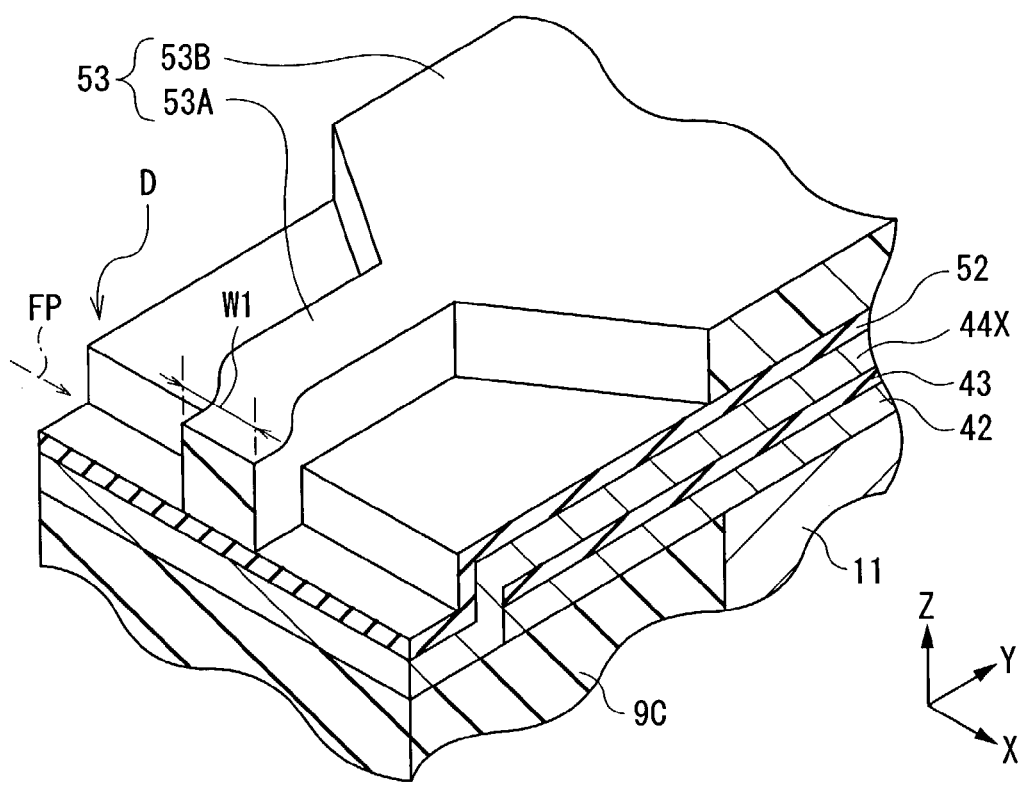
FIG. 27 is a perspective view corresponding to the sectional views shown in FIGS. 22A and 22B.

Then, as shown in FIGS. 22A, 22B and 27, the precursory main pole layer 44X made of a material with a high saturated magnetic flux density and the non-magnetic layer 52 made of, for example, alumina are laminated in this order on the whole surface through, for example, sputtering. The precursory main pole layer 44X is a preparatory layer which becomes the main pole layer 44 through patterning in a later step. As the material of the precursory main pole layer 44X, for example, a material with a higher saturated magnetic flux density than that of the material of the precursory auxiliary pole layer 42X is used, and more specifically, for example, an iron-cobalt based alloy is used. The non-magnetic layer 52 is used as a mask when the precursory main pole layer 44X is patterned in a later step. The precursory main pole layer 44X is formed on the auxiliary pole layer 42 and the non-magnetic layer 43 in the rear so as to have a step, and is connected with the auxiliary pole layer 42 at the flare point FP. The non-magnetic layer 52 is formed so as to include a step portion D corresponding to a base structure comprising the precursory main pole layer 44X with a step. Herein, the precursory main pole layer 44X corresponds to a specific example of "a precursory main pole layer" in the invention.

Next, as shown in FIGS. 22A, 22B and 27, the mask layer 53 for etching is selectively formed so as to coat the whole surface of the non-magnetic layer 52, that is, a region corresponding to both of the uniform width region R1 and the widening width region R2 through photolithography. The mask layer 53 is formed in a pattern shape substantially corresponding to, for example, a plane shape of the main pole layer 44 which is finally formed, and including a front portion 53A with the same uniform width W1 as that of the front end portion 44A and a rear portion 53B with a larger width than that of the front portion 53A, and more specifically the front portion 53A is formed so as to extend from a position which becomes the air bearing surface 20 in a later step to the rear through the step portion D of the non-magnetic layer 52.

Figure 23B:
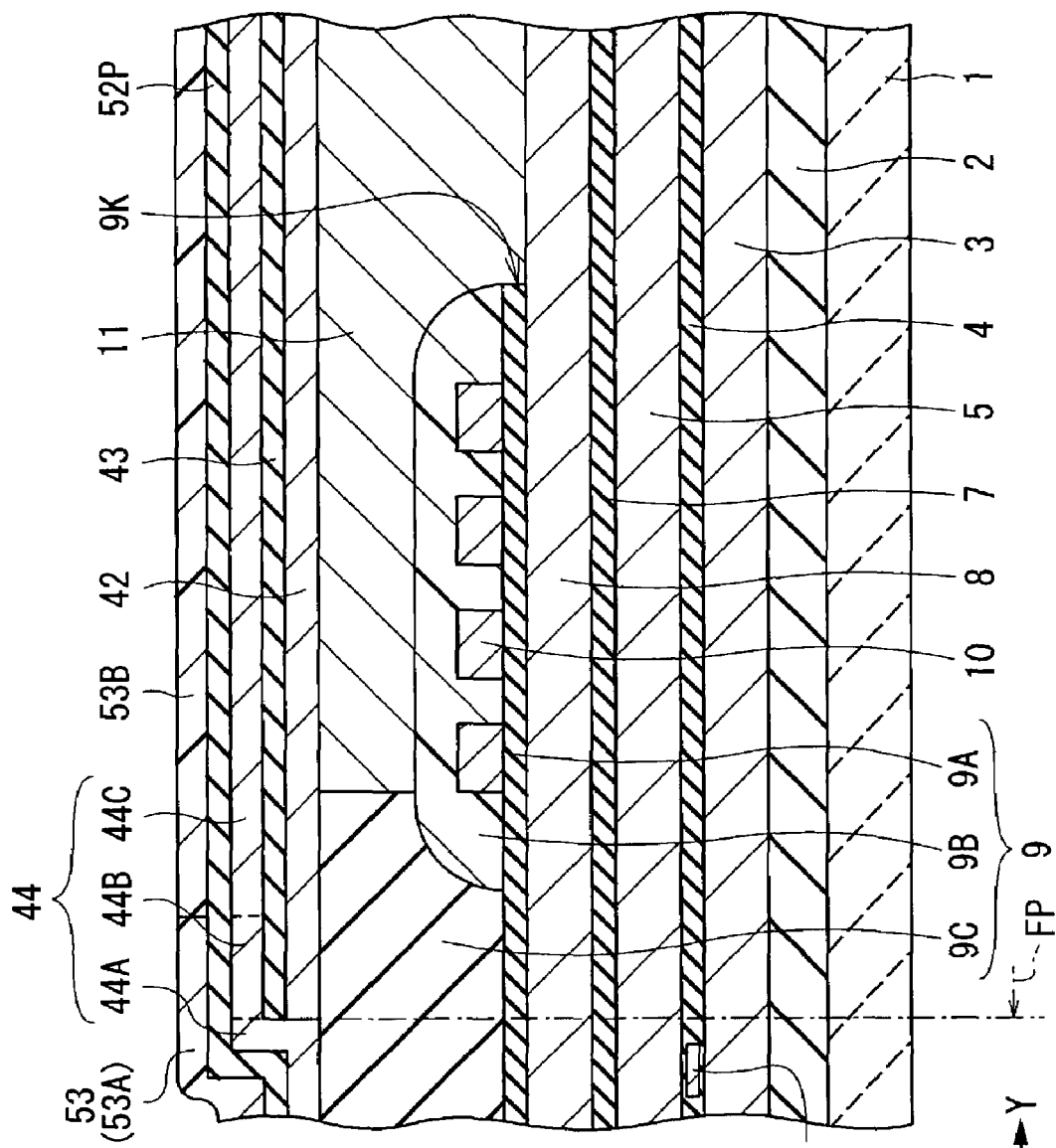
FIGS. 23A and 23B are sectional views for describing a step following the step of FIGS. 22A and 22B.
Figure 23A:
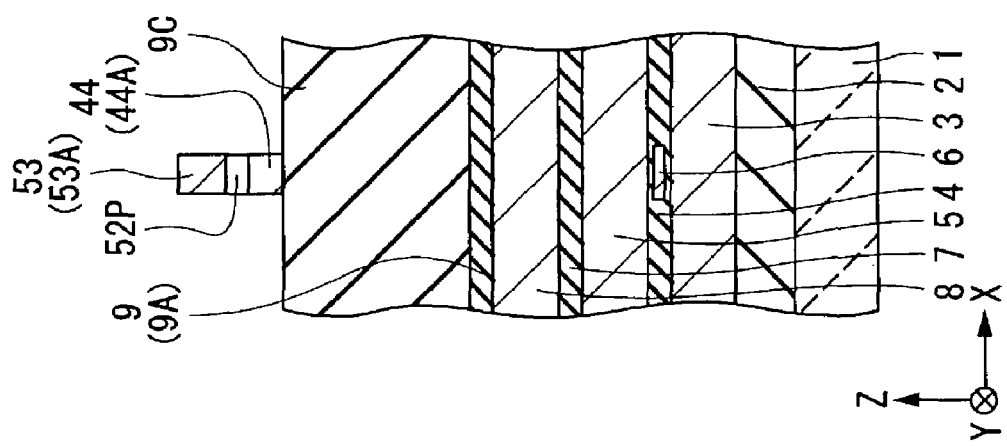
Figure 28:
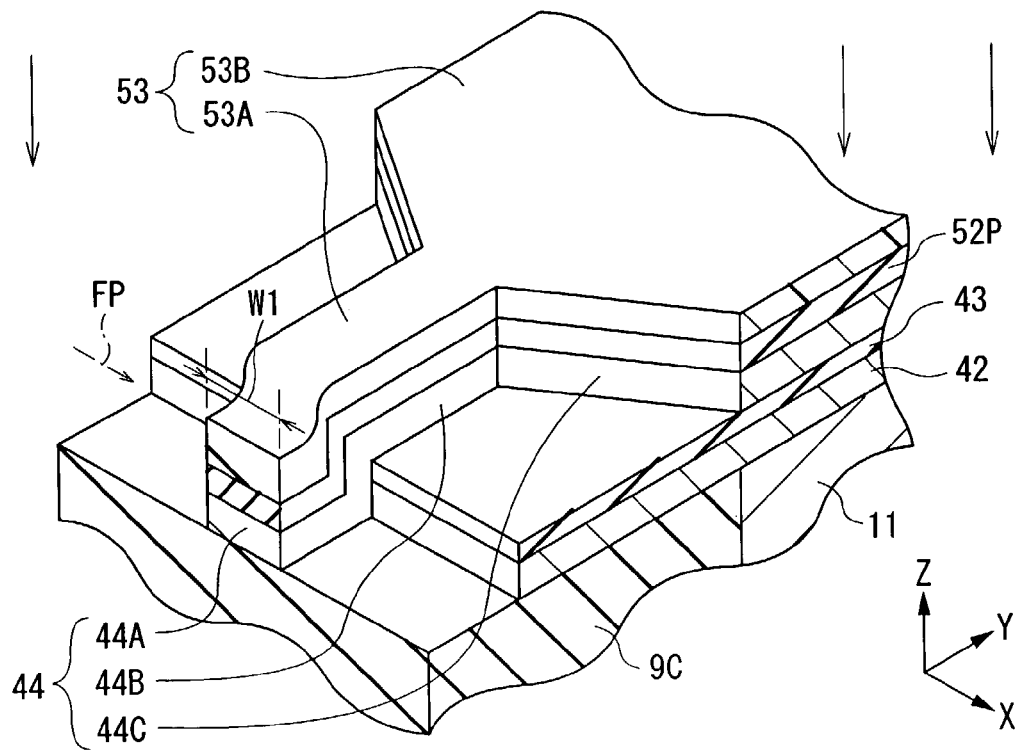
FIG. 28 is a perspective view corresponding to the sectional views shown in FIGS. 23A and 23B.

Then, the whole surface is etched through, for example, RIE by use of the mask layer 53. As shown in FIGS. 23A, 23B and 28, the non-magnetic layer 52 is patterned through the etching so as to form substantially the same pattern shape as the mask layer 53, thereby the non-magnetic layer pattern 52P is formed. Herein, an aggregate of the mask layer 53 and the non-magnetic layer pattern 52P corresponds to a specific example of "a second mask layer" in the invention.

Next, the whole surface is continued to be etched through, for example, ion milling by use of the mask layer 53 and the non-magnetic layer pattern 52P as masks, thereby the precursory main pole layer 44X is patterned. A region of the precursory main pole layer 44X except for a portion corresponding to the mask layer 53 is selectively removed through etching, thereby as shown in FIGS. 23A, 23B and 28, the main pole layer 44 is formed so as to include the front end portion 44A, the middle portion 44B and the rear end portion 44C in order from the front. The mask layer 53 itself is also etched during the etching, so the thickness thereof is reduced.

Figure 24B:
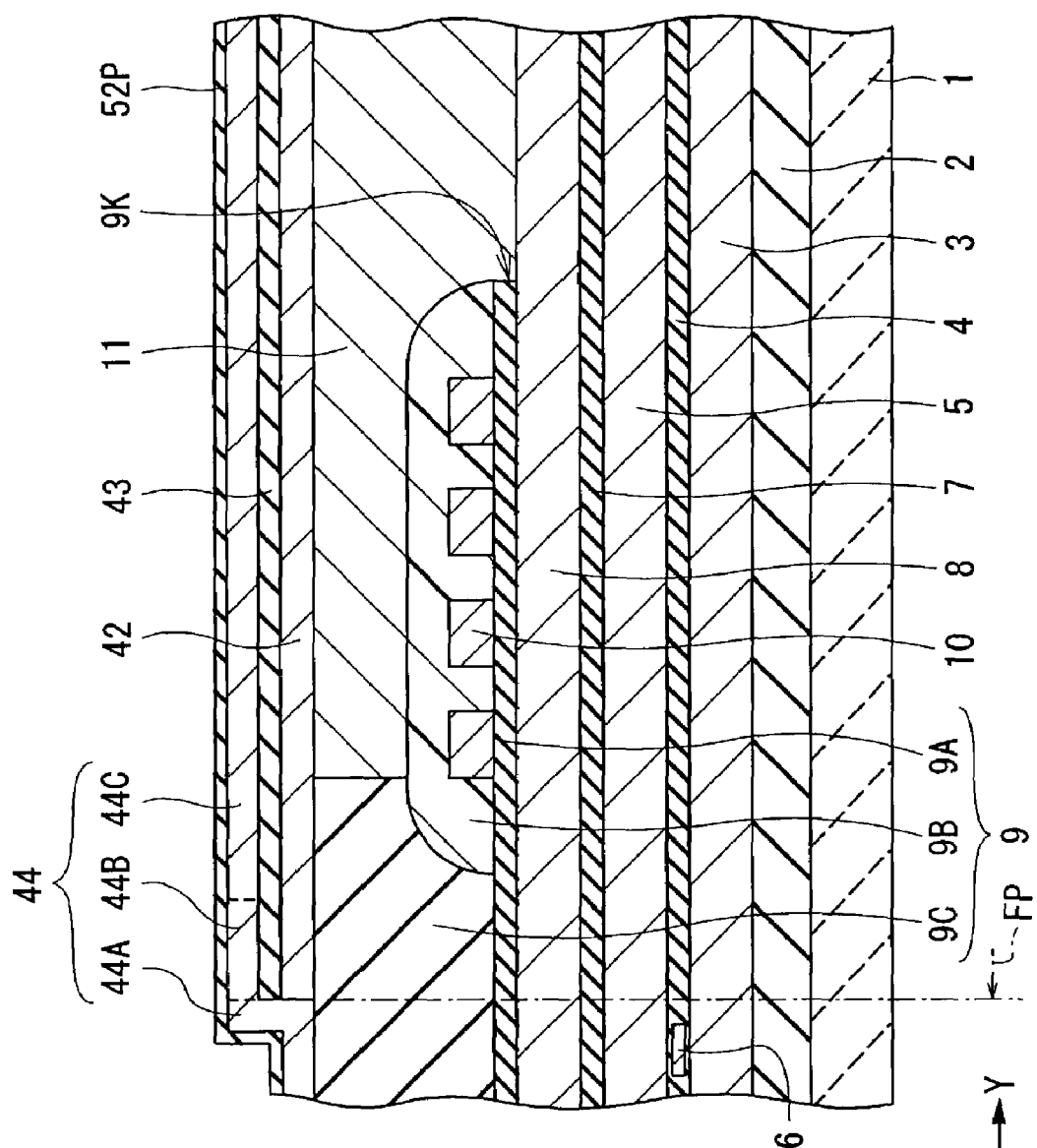
FIGS. 24A and 24B are sectional views for describing a step following the step of FIGS. 23A and 23B.
Figure 24A:
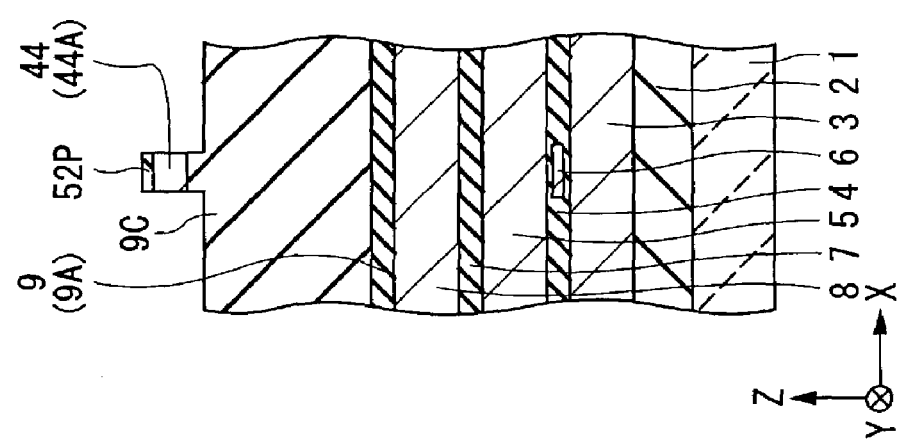

Finally, by use of the mask layer 53 and the non-magnetic layer pattern 52P as masks, the whole surface is continued to be etched, thereby as shown in FIGS. 24A, 24B and 17, the gap layer portion 9C in the neighborhood of the front end portion 44A in a region frontward of the flare point FP is selectively dug down. Through the etching, a region of the non-magnetic layer 43 except for a portion corresponding to the non-magnetic layer pattern 52P is selectively dug down in partway, and after the mask layer 53 is removed through etching, the non-magnetic layer pattern 52P is etched so as to be reduced. Thereby, the laminate including the auxiliary pole layer 42, the non-magnetic layer 43 and the main pole layer 44 is completed.

As described above, in the method of manufacturing the thin film magnetic head according to the embodiment, in order to form the laminate including the auxiliary pole layer 42, the non-magnetic layer 43 and the main pole layer 44, two different types of mask layers 51 and 53 are used to perform a series of patterning steps, so the widening width region R2 is determined by the mask layer 51, thereby the flare point FP is determined, and the uniform width region R1 is determined by the mask layer 53, thereby, the processed width W1 of the front end portion 44A is determined. Therefore, highly accurate formation of the processed width W1 of the front end portion 44A and proper positioning of a flare point are compatible by the effects equal to those of the first embodiment, so the thin film magnetic head which can contribute to an improvement in the recording performance can be manufactured.

Processes, functions, effects, modifications or the like in the thin film magnetic head and the method of manufacturing the same according to the embodiment except for those described above are equivalent to those in the first embodiment.

Up to this point, descriptions about the thin film magnetic head according to the first and the second embodiment of the invention are completed.

Figure 29:
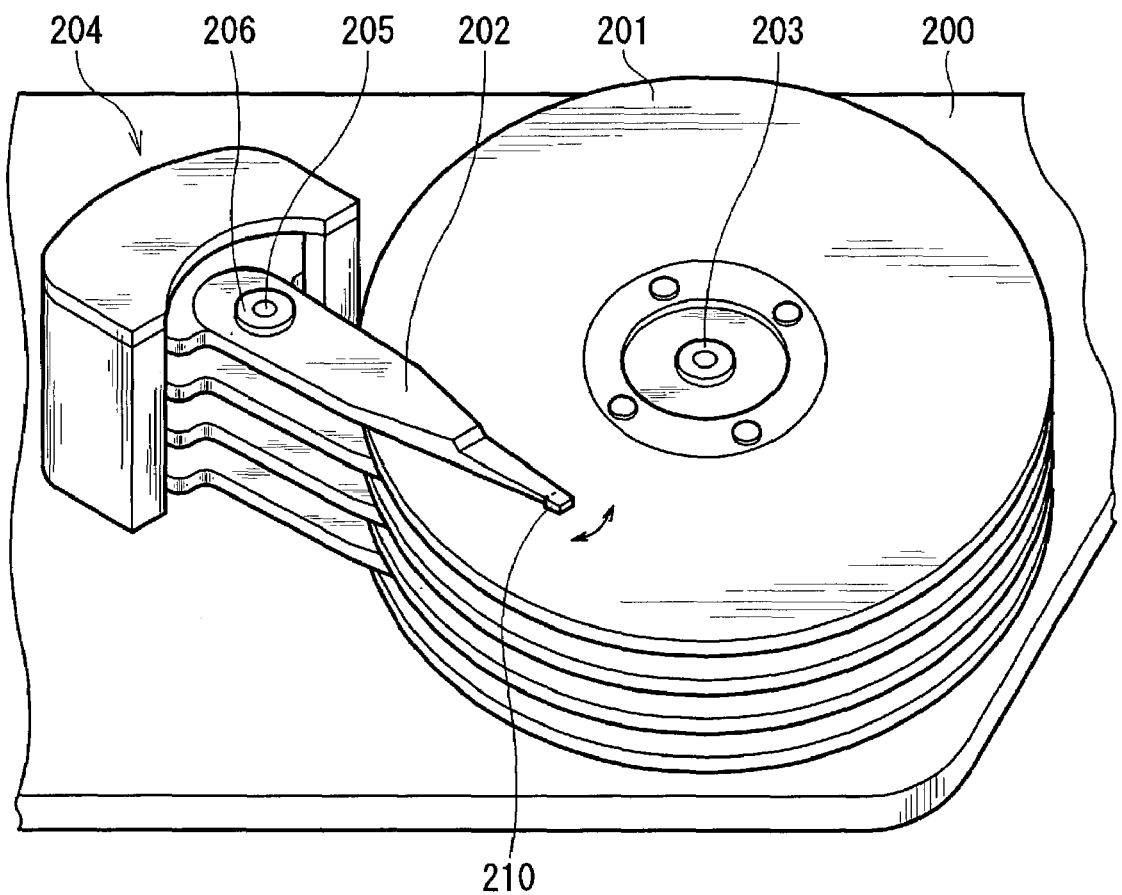
FIG. 29 is a cutaway outline view of a magnetic recording apparatus comprising a thin film magnetic head according to the invention.
Figure 30:
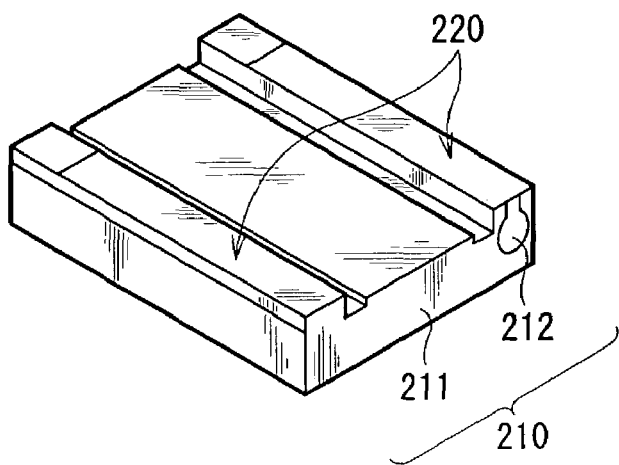
FIG. 30 is an enlarged outline view of a main part of the magnetic recording apparatus shown in FIG. 29.
Figure 31:
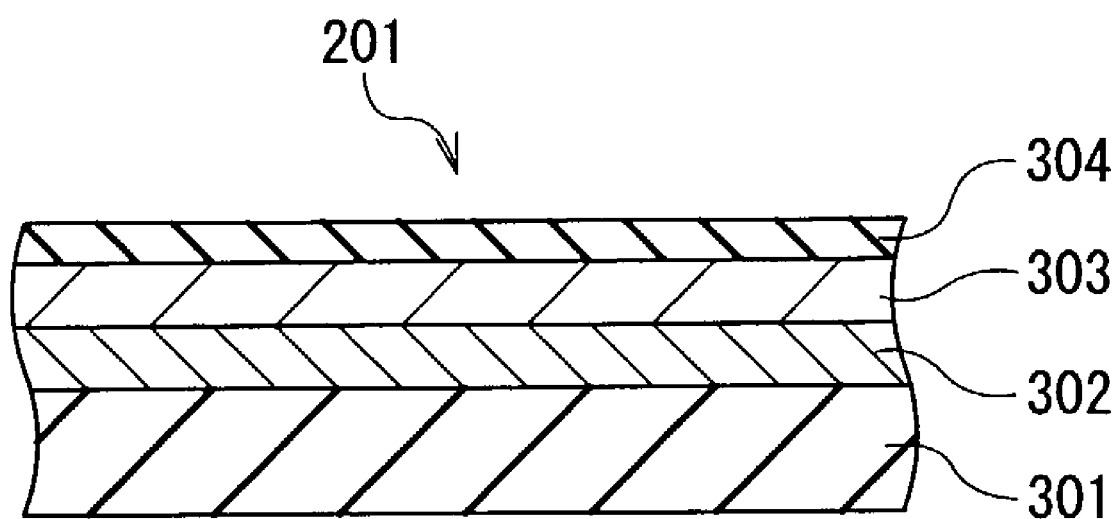
FIG. 31 is a sectional view of a magnetic disk.

Next, referring to FIGS. 29 through 31, a structure of a magnetic recording apparatus comprising the thin film magnetic head described in the first and the second embodiments will be described below. FIG. 29 shows a cutaway outline view of the magnetic recording apparatus, and FIG. 30 shows an enlarged outline view of a main part (head slider)

of the magnetic recording apparatus, and further FIG. 31 shows a sectional view of a magnetic disk (recording medium) mounted on a magnetic recording layer.

The magnetic recording apparatus is used as, for example, a hard disk drive, and comprises a plurality of magnetic disks 201 as recording media on which information is recorded and a plurality of arms 202 disposed so as to correspond to each magnetic disk 201 and each having a head slider 210 on an end in an enclosure 200. The magnetic disks 201 are rotatable around a spindle motor 203 fixed on the enclosure 200 as a center. The arms 202 are connected with a driving portion 204 as a power source, and are pivotable about a fixed shaft 205 fixed on the enclosure 200 as a center through a bearing 206. FIG. 29 shows, for example, a model that the plurality of arms 202 integrally pivot about the fixed shaft 205 as a center.

The head slider 210 has such a structure that a perpendicular recording system thin film magnetic head 212 is disposed on a side surface perpendicular to an air bearing surface 220 (a surface on a front side in FIG. 30) of a substantially-rectangular-shaped substrate 211 having a groove portion so as to reduce air resistance while the arms 202 pivots. The thin film magnetic head 212 has, for example, the structure described in the first or the second embodiment. In order to easily show a structure of the head slider 210 viewed from a side of the air bearing surface 220, FIG. 30 shows the head slider 210 in a state of FIG. 29 turned upside down.

The magnetic disk 201 is a recording medium for perpendicular recording having, for example, a two-layer structure. The magnetic disk 201 comprises, for example, a magnetic flux return layer 302, a recording layer 303 and a cap layer 304 laminated on a circular-plate-shaped substrate disk 301. The magnetic flux return layer 302 forms a flow path where magnetic flux having recorded information on the recording layer 303 returns to the thin film magnetic head 212, and is made of, for example, Permalloy, a cobalt-chromium-zirconium alloy (CoCrZr), an iron-aluminum alloy suicide (FeAlSi) or the like. The recording layer 303 is a layer where the information is magnetically recorded by the magnetic flux emitted from the thin film magnetic head 212, that is, a perpendicular magnetic field, and is made of, for example, a cobalt-chromium-platinum alloy (CoCrPt) or the like. The cap layer 304 is provided to protect the recording layer 303 from its surroundings.

The structure of the thin film magnetic head 212 has been already described in detail in the first and the second embodiments, and will not be further described.

In the magnetic recording apparatus, the arm 202 pivots during recording the information so that the head slider 210 moves to a predetermined region (recording region) of the magnetic disk 201 Then, when the thin film magnetic head 212 is electrically conducted in a state of facing the magnetic disk 201, the thin film magnetic head 212 acts as described in the first and the second embodiments so as to record the information on the magnetic disk 201.

In the magnetic recording apparatus, the thin film magnetic head 212 according to the invention is comprised, so as described in the first and the second embodiments, on the basis of the characteristic structure of the thin film magnetic head 212 having the laminate including the main pole layer, the non-magnetic layer and the auxiliary pole layer, the generation intensity and the magnetic field gradient of the perpendicular magnetic field can be obtained, thereby the recording performance can be improved.

Functions, effects, modifications or the like regarding the magnetic recording apparatus except for those described above are equivalent to those in the first and the second embodiments.

EXAMPLE

Next, a result of an experiment for determining various properties of the thin film magnetic head according to the invention will be described below.

Figure 32:
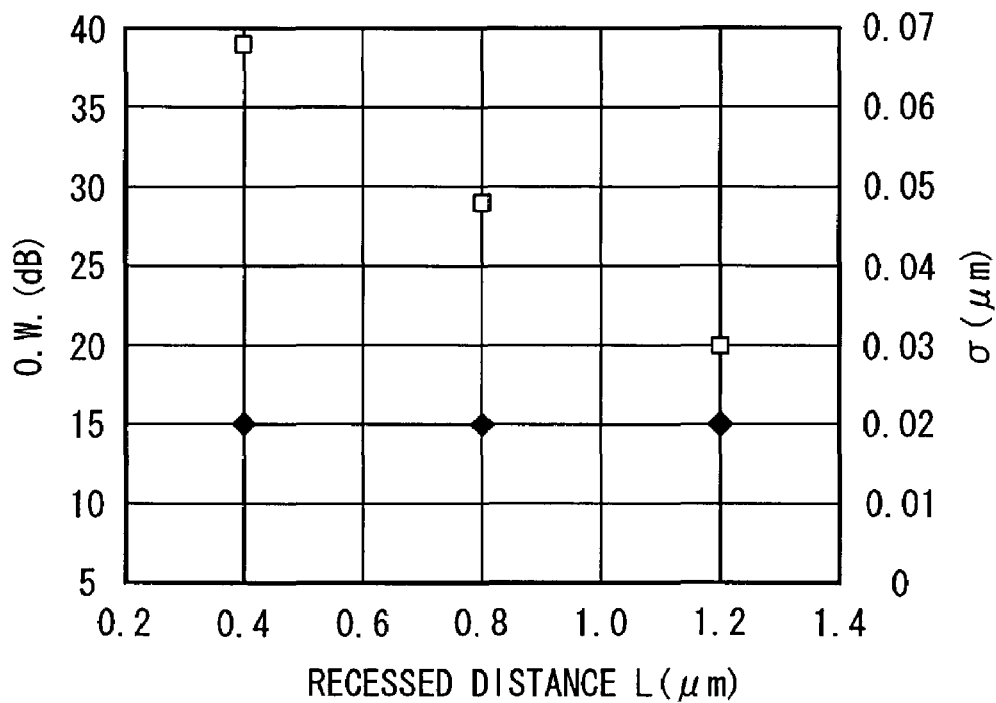
FIG. 32 is a graph for describing an advantage of a method of manufacturing the thin film magnetic head according to the invention.
Figure 33:
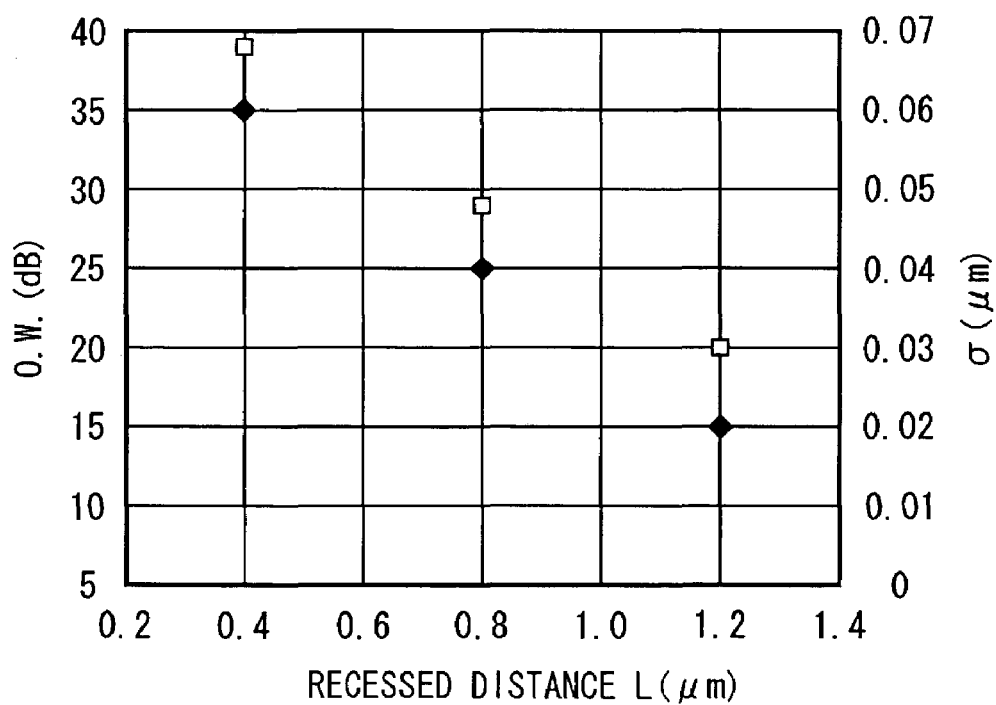
FIG. 33 is a graph for describing a disadvantage of a conventional method of manufacturing a thin film magnetic head.

When the thin film magnetic head comprising the laminate including the main pole layer, the non-magnetic layer and the auxiliary pole layer formed through the method of manufacturing the thin film magnetic head according to the invention was manufactured so as to determine the properties thereof, a result shown in FIG. 32 was obtained. FIG. 32 shows an advantage of the thin film magnetic head and the method of manufacturing the same according to the invention, and a "lateral axis" indicates the recessed distance L ($\mu$m), and a "vertical axis" indicates an overwrite (O.W.) property (dB; "□") and a standard deviation σ of the processed width W1 of the front end portion ($\mu$m; "♦"). Moreover, in order to compare with the invention, a thin film magnetic head was manufactured through a conventional method of manufacturing a thin film magnetic head so as to determine properties thereof, and the result are shown in FIG. 33.

Conventionally (refer to FIG. 33), when the recessed distance L was reduced, that is, the flare point FP was brought closer to the air bearing surface, the overwrite property was improved, however, the standard deviation σ of the processed width W1 increased, thereby the processing accuracy of the main pole layer (the front end portion) declined. On the other hand, in the invention (refer to FIG. 32), even though the recessed distance L was reduced, the standard deviation o of the processed width W1 did not increase and was held substantially constant. Accordingly, in the invention, the recessed distance L can be reduced so as to improve the overwrite property without a decline in the processing accuracy of the main pole layer (the front end portion). Therefore, it was confirmed that the thin film magnetic head and the method of manufacturing the same according to the invention had an advantage of improving the recording performance.

The invention is described with reference to some embodiments, but the invention is not limited to these embodiments, and can be variously modified. More specifically, the structures and operating mechanisms of the thin film magnetic head and the magnetic recording apparatus shown in the embodiments and detailed descriptions regarding the method of manufacturing the thin film magnetic head are not necessarily limited to the above embodiments. The thin film magnetic head, the method of manufacturing the same and the magnetic recording apparatus can be freely modified as long as two kinds of masks which are different from each other are used to form the laminate including the main pole layer, the non-magnetic layer and the auxiliary pole layer, and while the widening width region is determined by use of one of the mask layers so as to determine the flare point, the uniform width region is determined by use of the other mask layer so as to determine the processed width of the front end portion of the main pole layer, thereby the recording performance can be improved by compatibility between highly accurate formation of the processed width of the front end portion and proper positioning of a flare point.

Moreover, in the embodiments, the case where the invention is applied to "a single pole type head" is described, but it is not limited to this. For example, the invention may be applied to "a ring-type head".

Further, in the embodiments, the case where the invention is applied to a composite thin film magnetic head is described, but it is not limited to this. The invention is applicable to, for example, a thin film magnetic head for recording only comprising an inductive magnetic transducer for writing or a thin film magnetic head having an inductive magnetic transducer for recording/reproducing. In addition, the invention is applicable to a thin film magnetic head with a structure in which a device for writing and a device for reading are inversely laminated. Further, the invention is applicable to not only the perpendicular recording system thin film magnetic head but also a longitudinal recording system thin film magnetic head.

Moreover, in the embodiments, the case where the thin film magnetic head of the invention is applied to the hard disk drive is described, but it is not necessarily limited to this. For example, the thin film magnetic head is applicable to any other apparatus performing the same recording process as the hard disk drive.

As described above, according to the thin film magnetic head of the invention, the pole layer is formed so as to comprise the laminate including the main pole layer and the auxiliary pole layer disposed in a region partially facing the main pole layer with the non-magnetic layer in between, so the magnetic flux generated in the thin film coil is contained in the main pole layer, and is also contained in the auxiliary pole layer through the non-magnetic layer. After the magnetic flux contained in the auxiliary pole layer is concentrated on the neighborhood of the front end thereof, the magnetic flux passes through the non-magnetic layer so as to flow into the main pole layer. Thereby, the magnetic flux passing through both of the main pole layer and the auxiliary pole layer is concentrated on a portion of the main pole layer on the medium-outgoing side which is a main magnetic flux emitting portion, so compared with the case where the pole layer includes only the main pole layer and does not include the auxiliary pole layer, an amount of the magnetic flux supplied to a portion of the main pole layer on the medium-outgoing side increases more. Therefore, an amount of the magnetic flux emitted from the main pole layer to the recording medium increases, thereby the generation intensity and the magnetic field gradient of the magnetic field for magnetically recording information on the recording medium can be obtained, so the recording performance can be improved.

According to the method of manufacturing the thin film magnetic head of the invention, after the first mask layer for determining the widening width region and the second mask layer for determining the uniform width region are formed through separate steps, the formation of the pole layer is completed through a series of patterning steps by use of the first and the second mask layers, so when the pole layer is formed, the widening width region is determined by use of the first mask layer so as to determine a position (flare point) where the width of the pole layer expands from the uniform width region to the widening width region. Further, the uniform width region is determined by use of the second mask layer so as to determine the processed width of the main part having a uniform width determining the recording track width in the pole layer. Therefore, unlike the conventional method in which it is difficult to be compatible between highly accurate formation of the main part of the pole layer and proper positioning of a flare point, an influence of reflected light during photolithography can be prevented so as to control the processed width of the main part of the pole layer with high accuracy, and the flare point can be adjusted, so in the viewpoint of manufacturing the thin film magnetic head, the invention can contribute to an improvement in recording performance.

According to the magnetic recording apparatus of the invention, the thin film magnetic head of the invention is comprised, so the generation intensity and the magnetic field gradient of the magnetic field for magnetically recording the information on the recording medium can be obtained on the basis of the characteristic structure of the thin film magnetic head comprising the laminate including the main pole layer, the non-magnetic layer and the auxiliary pole layer. Therefore, the recording performance can be improved.

Moreover, according to the thin film magnetic head of the invention, the main pole layer is made of a material with a saturated magnetic flux density equal to or higher than that of the auxiliary pole layer, so an amount of the magnetic flux contained in the main pole layer including the main magnetic flux emitting portion increases more than that in the auxiliary pole layer. Therefore, in the viewpoint of an increase in the amount of the magnetic flux contained in the main pole layer, the thin film magnetic head of the invention can contribute to obtaining the intensity of the magnetic field for recording.

Obviously many modifications and variations of the present invention are possible in the light of the above teachings. It is therefore to be understood that within the scope of the appended claims the invention may be practiced otherwise than as specifically described.

What is claimed is:

1. A method of manufacturing a thin film magnetic head, the thin film magnetic head comprising:
   a thin film coil generating magnetic flux, and
   a pole layer comprising a laminate including a main pole layer having a plane shape including a uniform width region with a uniform width determining a recording track width of a recording medium and a widening width region with a larger width than the uniform width region, and having an end surface exposed to a recording-medium-facing surface facing the recording medium, an auxiliary pole layer being disposed so as to face a part of the main pole layer, and a non-magnetic layer being disposed in a region where the main pole layer and the auxiliary pole layer face each other so as to be sandwiched between these two layers, and the pole layer emitting the magnetic flux generated in the thin film coil to the recording medium,
   the method comprising:
   forming a first mask layer to become a mask determining the widening width region;
   forming a second mask layer to become a mask determining the uniform width region, wherein the first mask layer and the second mask layer are independently formed through separate steps; and
   completing formation of the pole layer through a series of patterning steps for at least two of the main pole layer, the auxiliary pole layer and the non-magnetic layer by use of the first mask layer and the second mask layer.

2. A method of manufacturing a thin film magnetic head according to claim 1, wherein
   a step of forming the first mask layer is carried out before a step of forming the second mask layer.

3. A method of manufacturing a thin film magnetic head according to claim 1, wherein
   a step of forming the pole layer comprises the steps of:
   forming and laminating a precursory main pole layer as a preparatory layer of the main pole layer, a precursory non-magnetic layer as a preparatory layer of the non-magnetic layer and a precursory auxiliary pole layer as a preparatory layer of the auxiliary pole layer in this order, selectively forming the first mask layer on the precursory auxiliary pole layer in a region corresponding to the widening width region, patterning the precursory auxiliary pole layer through etching by use of the first mask layer as a mask so as to form a precursory auxiliary pole layer pattern, selectively forming the second mask layer on the precursory auxiliary pole layer pattern and its surroundings in a region corresponding to the uniform width region and the widening width region, patterning the precursory non-magnetic layer through etching by use of the auxiliary pole layer pattern and the second mask layer as masks so as to form the non-magnetic layer, patterning the precursory main pole layer through etching by use of the second mask layer, the precursory auxiliary pole layer pattern and the non-magnetic layer as masks so as to form the main pole layer, and patterning the precursory auxiliary pole layer pattern through etching by use of the second mask layer as a mask so as to form the auxiliary pole layer.

4. A method of manufacturing a thin film magnetic head according to claim 1, wherein
a step of forming the pole layer comprises the steps of:
forming and laminating a precursory auxiliary pole layer as a preparatory layer of the auxiliary pole layer and a precursory non-magnetic layer as a preparatory layer of the non-magnetic layer in this order, selectively forming the first mask layer on the precursory non-magnetic layer in a region corresponding to the widening width region, patterning the precursory non-magnetic layer by use of the first mask layer as a mask so as to form the non-magnetic layer, patterning the precursory auxiliary pole layer through etching by use of the first mask layer as a mask so as to form the auxiliary pole layer, forming a precursory main pole layer as a preparatory layer of the main pole layer on the non-magnetic layer and its surroundings, selectively forming the second mask layer on the precursory main pole layer in a region corresponding to the uniform width region and the widening width region, and patterning the precursory main pole layer through etching by use of the second mask layer as a mask so as to form the main pole layer.

5. A method of manufacturing a thin film magnetic head according to claim 1 wherein completing formation of the pole layer comprises:
completing formation of the pole layer through a series of patterning steps for the main pole layer, the auxiliary pole layer and the non-magnetic layer by use of the first mask layer and the second mask layer.

* * * * *